United States Patent
Sasaki

(10) Patent No.: US 6,624,691 B1
(45) Date of Patent: Sep. 23, 2003

(54) DEMODULATOR FOR PROCESSING DIGITAL SIGNAL

(75) Inventor: Eisaku Sasaki, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/857,130

(22) PCT Filed: Oct. 4, 2000

(86) PCT No.: PCT/JP00/06925
§ 371 (c)(1),
(2), (4) Date: Jun. 1, 2001

(87) PCT Pub. No.: WO01/26316
PCT Pub. Date: Apr. 12, 2001

(30) Foreign Application Priority Data

Oct. 4, 1999 (JP) ............................................. 11-282784

(51) Int. Cl.$^7$ ................................................. H03D 3/00
(52) U.S. Cl. ......................... 329/304; 329/306; 375/325
(58) Field of Search ................................. 329/304, 306, 329/307, 308; 375/326, 327, 244; 708/300, 313, 316

(56) References Cited

U.S. PATENT DOCUMENTS

| | | | | |
|---|---|---|---|---|
| 4,802,110 A | * | 1/1989 | Richards et al. | 382/260 |
| 5,432,813 A | * | 7/1995 | Barham et al. | 375/152 |
| 5,610,948 A | * | 3/1997 | Ninomiya et al. | 375/324 |
| 6,121,828 A | * | 9/2000 | Sasaki | 329/304 |
| 6,127,897 A | * | 10/2000 | Sasaki | 331/25 |
| 6,260,053 B1 | * | 7/2001 | Maulik et al. | 708/313 |
| 6,411,658 B1 | * | 6/2002 | Sasaki | 375/326 |

FOREIGN PATENT DOCUMENTS

| | | |
|---|---|---|
| JP | 60-75117 | 4/1985 |
| JP | 62-84611 | 4/1987 |
| JP | 62-293811 | 12/1987 |
| JP | 2-156732 | 6/1990 |
| JP | 2-206217 | 8/1990 |
| JP | 2-216907 | 8/1990 |
| JP | 3-293843 | 12/1991 |
| JP | 6-104943 | 4/1994 |
| JP | 6-216706 | 8/1994 |
| JP | 6-350660 | 12/1994 |
| JP | 7-087145 | 3/1995 |
| JP | 8-139775 | 5/1996 |
| JP | 8-251249 | 9/1996 |
| JP | 9-83588 | 3/1997 |
| JP | 9-247229 | 9/1997 |
| JP | 10-023096 | 1/1998 |
| JP | 10-229423 | 8/1998 |
| JP | 10-322405 | 12/1998 |

OTHER PUBLICATIONS

International Search Report dated Dec. 15, 2000.
Yoshizawa et al., "Development of Digital Demodulator LSI for Satellite Communications", IEICE Technical Report SAT Satellite Communication, Oct. 19, 1990.

* cited by examiner

Primary Examiner—Robert Pascal
Assistant Examiner—Kimberly E Glenn
(74) Attorney, Agent, or Firm—McGinn & Gibb, PLLC

(57) ABSTRACT

The serial data signal obtained by carrying out an N/D conversion at two times the modulation speed is S/P-converted, at a data ratio of 1:2, into a pair of parallel data signals of the modulation speed. The demodulation process is carried out by parallelly processing the pair of parallel data signals, resulting in that the demodulation speed is equal to the modulation speed. The serial data obtained by carrying out the A/D conversion at four times the modulation speed is S/P-converted at a data ratio of 1:4, and is then similarly subjected to demodulation at the demodulation speed equal to the modulation speed. With this arrangement, the demodulator carrying out the digital signal processing can be applied to communication systems having a high modulation speed.

29 Claims, 18 Drawing Sheets

DEMODULATOR FOR PROCESSING DIGITAL SIGNAL

TECHNICAL FIELD

The present invention relates to a demodulator for demodulating a quadrature-modulated input signal and more particularly to a demodulator applying a digital signal processing technique.

BACKGROUND OF THE INVENTION

With the rapid progress of the LSI technology, it has been attempted to apply the digital signal processing technology to demodulators in a field of high-speed communication system with a modulation speed of, for example, 10 MHz. The demodulator applying the digital signal processing technology (hereinafter referred to as a digital demodulator) has a variety of advantages over a demodulator formed of analog circuits. For example, the digital demodulator has no variations in temperature and humidity with elapse of time and thus realizes a stable performance. The digital demodulator can also be fabricated in the form of an LSI. Further, the digital demodulator requires no adjustment and yet allows its specifications to be changed easily.

In order to realize, by the use of the digital signal processing technology, the main functions of the demodulator including a roll-off filter, the sampling rate must be compliant with a sampling theorem. In the theorem, the sampling frequency must be more than two times the maximum frequency component of a signal. That is, if the modulation speed is 10 MHz, the sampling rate needs to be 20 MHz or higher. Similarly, if the modulation speed is 20 MHz, the sampling rate needs to be 40 MHz or higher.

To enable the digital demodulation to be performed at the same speed as this sampling rate, the digital demodulator needs to be constructed of very fast devices and is also required to perform pipeline processing.

However, as the sampling rate is further increased accompanying with an increase in the modulation speed, the operation speed of the devices may not be able to catch up with the increased sampling rate. For example, if the modulation speed exceeds 50 MHz, realizing such devices with the present technology is very difficult.

Further, as the sampling rate increases, the number of pipelining stages also increases. This means an increase in "delay" in the pipeline processing. An increased delay will inevitably enlarge a scale of the circuit and lead to degradation of feedback control characteristics, particularly carrier wave reproduction loop characteristics.

To solve the problem described above, it is an object of the present invention to provide a digital demodulator that can be applied to higher-speed communication systems.

DISCLOSURE OF THE INVENTION

The present invention solves the above problems by carrying out a serial-parallel conversion (S/P conversion) on an A/D-converted signal to make the demodulation speed equal to the modulation speed. In addition, the present invention arranges various components performing the digital demodulation processing in such a way that they can perform parallel processing. More specifically, the present invention provides the following demodulator, and so on.

According to one aspect of the invention, the demodulator comprises:

an analog quadrature detector, responsive to a quadrature-modulated IF signal, to carry out an analog quadrature detection by the use of a predicted carrier frequency having a frequency substantially equal to an actual carrier frequency, and to output first and second quadrature-detected signals that are orthogonal to each other;

first and second A/D converters, responsive to the first and second quadrature-detected signals, to carry out A/D-conversion therefor at a rate two or more times a modulation speed, respectively, and to output first and second serial signals;

first and second serial-parallel converters to convert the first and second serial signals into first and second sets of parallel signals, respectively, each of the first and second sets of parallel signals comprising a plurality of signals with the same data rate as the modulation speed;

a first parallel FIR filter to serve as a roll-off filter which parallelly filters the first set of parallel signals at the modulation speed to output a first pair of two filtered signals; and a second parallel FIR filter to serve as a roll-off filter which parallelly filters the second set of parallel signals at the modulation speed to output a second pair of two filtered signals.

According to another aspect of the invention, the demodulator comprises:

an analog detector, responsive to a quadrature-modulated first IF signal, to carry out a detection by the use of a predetermined frequency whose difference from a predicted carrier frequency is a modulation speed, the predicted carrier frequency having a frequency substantially equal to an actual carrier frequency, the analog detector outputting a second IF signal having the modulation speed as a pseudo-carrier frequency;

an A/D converter, responsive to the second IF signal, to carry out A/D-conversion therefor at four times the modulation speed, and to output a serial signal;

a quadrature detector, responsive to the serial signal, to carry out quadrature-detection, and to output first and second sets of parallel signals, each of the first and second sets of parallel signals comprising a plurality of signals having the same data rates as the modulation speed;

a first parallel FIR filter to function as a roll-off filter which parallelly filters the first set of parallel signals at the modulation speed to output a first pair of two filtered signals; and a second parallel FIR filter to function as a roll-off filter which parallelly filters the second set of parallel signals at the modulation speed to output a second pair of two filtered signals.

For example, the first and second parallel FIR filters may have any of the following first to third parallel FIR filters in a case where the A/D conversion is carried out at two times the modulation speed. The first to third parallel FIR filters are suited to operate as a parallel roll-off filter which, in response to a pair of an odd-numbered data signal and an even-numbered data signal obtained by S/P-converting the serial data signal, to output a pair of a filtered odd-numbered data signal and a filtered even-numbered data signal.

According to one aspect of the invention, the first parallel FIR filter comprises: first to sixth delay circuits; first to tenth multipliers for which first to tenth multiplication coefficients are defined, respectively; and first to sixth adders; wherein:

the first to sixth delay circuits having predetermined times as their delay times, respectively;

the first, fifth, sixth and tenth multiplication coefficients are equal to each other;

the second, fourth, seventh and ninth multiplication coefficients are equal to each other;

the third and eighth multiplication coefficients are equal to each other;

the first and fourth delay circuits receive the odd-numbered data signal and the even-numbered data signal, respectively;

the second and fifth delay circuits receive outputs of the first and fourth delay circuits, respectively;

the third and sixth delay circuits receive outputs of the second and fifth delay circuits, respectively;

the first and second multipliers receive an output of the first delay circuit;

the third and fourth multipliers receive an output of the second delay circuit;

the fifth multiplier receives an output of the third delay circuit;

the sixth multiplier receives an output of the fourth delay circuit;

the seventh and eighth multipliers receive an output of the fifth delay circuit;

the ninth and tenth multipliers receive an output of the sixth delay circuit;

the first adder receives outputs of the first, third and fifth multipliers;

the second adder receives outputs of the second and fourth multipliers;

the third adder receives outputs of the sixth, eighth and tenth multipliers;

the fourth adder receives outputs of the seventh and ninth multipliers;

the fifth adder receives outputs of the first and fourth adders and produces, as an output of itself, the filtered odd-numbered data signal; and the sixth adder receives outputs of the second and third adders and produces, as an output of itself, the filtered even-numbered data signal.

According to another aspect of the invention, the second parallel FIR filter, each of said first and second parallel FIR filters, comprises: first to sixth delay circuits; first to sixth multipliers for which first to sixth multiplication coefficients are defined, respectively; and first to eighth adders; wherein:

the first to sixth delay circuits having predetermined times as their delay times, respectively;

the first and fourth multiplication coefficients are equal to each other;

the second and fifth multiplication coefficients are equal to each other;

the third and sixth multiplication coefficients are equal to each other;

the first and fourth delay circuits receive the odd-numbered data signal and the even-numbered data signal, respectively;

the second and fifth delay circuits receive outputs of the first and fourth delay circuits, respectively;

the third and sixth delay circuits receive outputs of the second and fifth delay circuits, respectively;

the first adder receives outputs of the first and third delay circuits;

the second adder receives outputs of the first and second delay circuits;

the third adder receives outputs of the fourth and sixth delay circuits;

the fourth adder receives outputs of the fifth and sixth delay circuits;

the first multiplier receives an output of the first adder;

the second multiplier receives an output of the second adder;

the third multiplier receives an output of the second delay circuit;

the fourth multiplier receives an output of the third adder;

the fifth multiplier receives an output of the fourth adder;

the sixth-multiplier receives an output of the fifth delay circuit;

the fifth adder receives outputs of the first and third multipliers;

the sixth adder receives outputs of the fourth and sixth multipliers;

the seventh adder receives outputs of the fifth adder and the fifth multiplier and produces, as an output of itself, the filtered odd-numbered data signal; and the eighth adder receives outputs of the sixth adder and the second multiplier and produces, as an output of itself, the filtered even-numbered data signal.

According to a further aspect of the invention, the third parallel FIR filter, each of said first and second parallel FIR filters, comprises: first to sixth delay circuits; first to eighth multipliers for which first to eighth multiplication coefficients are defined, respectively; and first to sixth adders; wherein:

the first to sixth delay circuits having predetermined times as their delay times, respectively;

the first, fourth, fifth and eighth multiplication coefficients are equal to each other;

the second, third, sixth and seventh multiplication coefficient are equal to each other;

the first and fourth delay circuits receive the odd-numbered data signal and the even-numbered data signal, respectively;

the second and fifth delay circuit receive outputs of the first and fourth delay circuits, respectively;

the third and sixth delay circuits receive outputs of the second and fifth delay circuits, respectively;

the first multiplier receives an output of the first delay circuit;

the second and third multipliers receive an output of the second delay circuit;

the fourth multiplier receives an output of the third delay circuit;

the fifth and sixth multipliers receive an output of the fifth delay circuit;

the seventh and eighth multipliers receive an output of the sixth delay circuit;

the first adder receives outputs of the first and third multipliers;

the second adder receives outputs of the second and fourth multipliers;

the third adder receives outputs of the fifth and seventh multipliers;

the fourth adder receives outputs of the sixth and eighth multipliers;

the fifth adder receives outputs of the second and third adders and produces, as an output of itself, the filtered odd-numbered data; and the sixth adder receives outputs of the first and fourth adders and produces, as an output of itself, the filtered even-numbered data signal.

BEST MODE FOR IMPLEMENTING THE INVENTION

Figure 1:
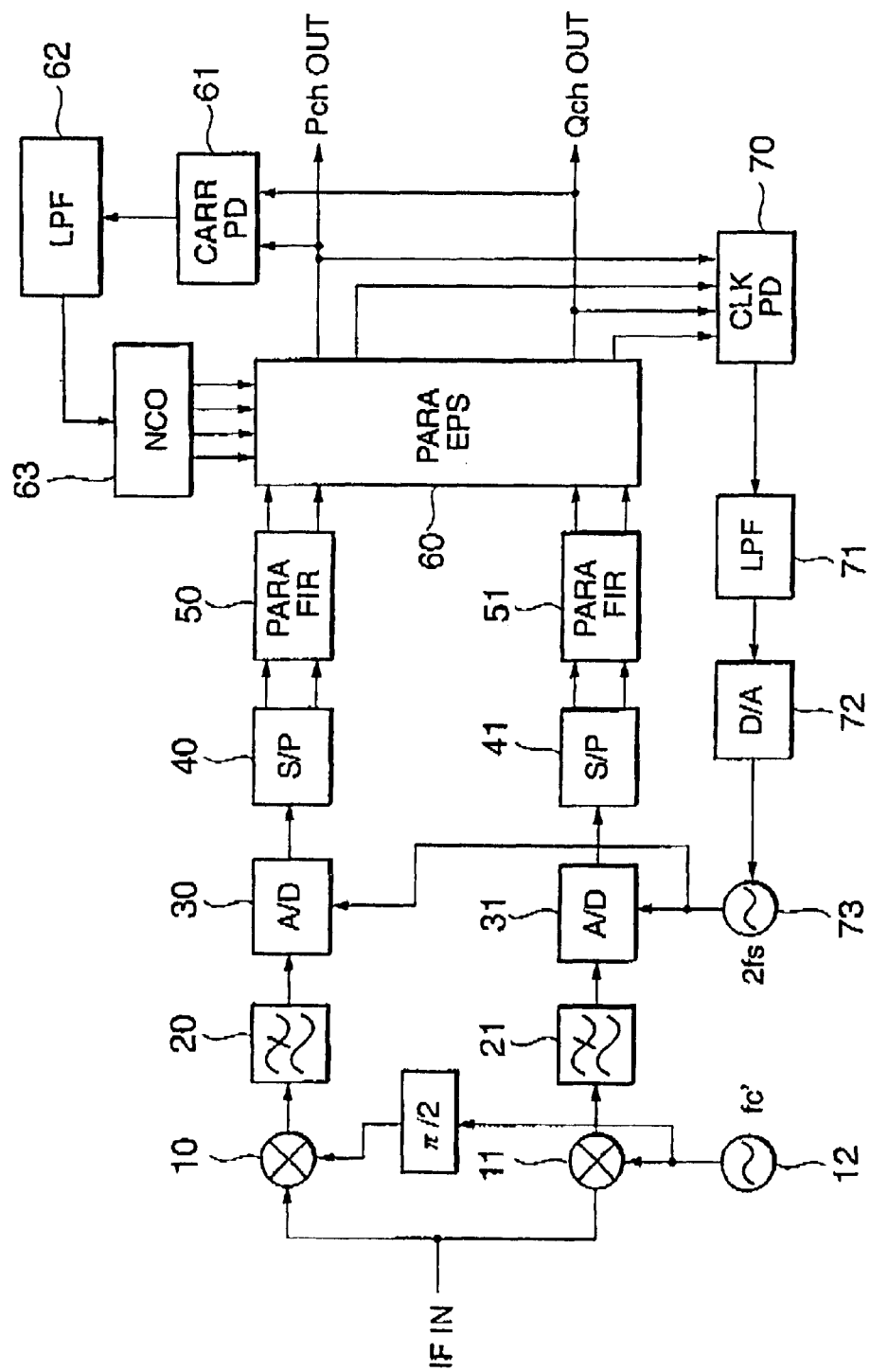
FIG. 1 is a block diagram showing a schematic structure of a demodulator according to a first embodiment of the invention.

As shown in FIG. 1, the demodulator according to the first embodiment of the present invention employs a semi-synchronous detection system.

When receiving a quadrature-modulated IF signal, the illustrated demodulator carries out at first a quadrature detection in an analog manner. The IF signal is split in two. One of the two split signals is multiplied in a mixer 11 by an Lo signal which is output from a local oscillator 12 and which has a frequency fc' substantially equal to the carrier frequency fc. The multiplied signal is then delivered to a low pass filter 21. The other of the split signals is multiplied in a mixer 10 by a signal which is obtained by shifting the phase of the Lo signal output from the local oscillator 12 by π2. The multiplied signal is then delivered to a low pass filter 20. The signals filtered by the low pass filters 20, 21 are base band (BB) signals that are orthogonal to each other. These signal channels are called a P-channel and a Q-channel, respectively. They are also called an I-component and a Q-component or a real component and an imaginary component.

The frequency fc' is a predicted carrier frequency and, strictly speaking, the frequency fc and the frequency fc' are not equal. Hence, the output of the analog quadrature detection includes a phase rotation corresponding to the difference between these frequencies.

In response to the quadrature-detected signals of P-channel and Q-channel, A/D converters 30, 31 carry out the A/D conversion, and output serial signals each composed of a plurality of bits.

For the purpose of constituting the roll-off filter by the use of digital signal processing circuits, the frequencies of the sampling clocks supplied to the A/D converters 30, 31 are determined so as to compliant with the sampling theorem. In this embodiment, the sampling rate is two times the modulation speed fs. If the modulation speed fs is relatively low considering the operation speed determined from the specification of the circuit, the sampling rate may be 4 fs or 8 fs.

An S/P converter 40 receives the P-channel serial signal output from the A/D converter 30 and performs the S/P conversion on the signal with a data ratio of 1:2 to output a pair of P-channel odd-numbered and even-numbered data signals. For example, consecutive serial data bits $D_n$ (n =1, 2, 3, ...) are divided into odd-numbered data bits $D_{2n-1}$ and even-numbered data bits $D_{2n}$. These odd-numbered data signals and even-numbered data signals have the same signal rates as the modulation speed fs. Similarly, an S/P converter 41 outputs a pair of Q-channel odd-numbered and even-numbered data signals.

A parallel FIR filter 50 serves as a roll-off filter and parallelly filters the P-channel odd-numbered and even-numbered data signals to output the filtered P-channel odd-numbered and even-numbered data signals. A parallel FIR filter 51 similarly carries out the filtering operation on the Q-channel odd-numbered and even-numbered data signals and outputs the filtered Q-channel odd-numbered and even-numbered data signals.

Figure 2:
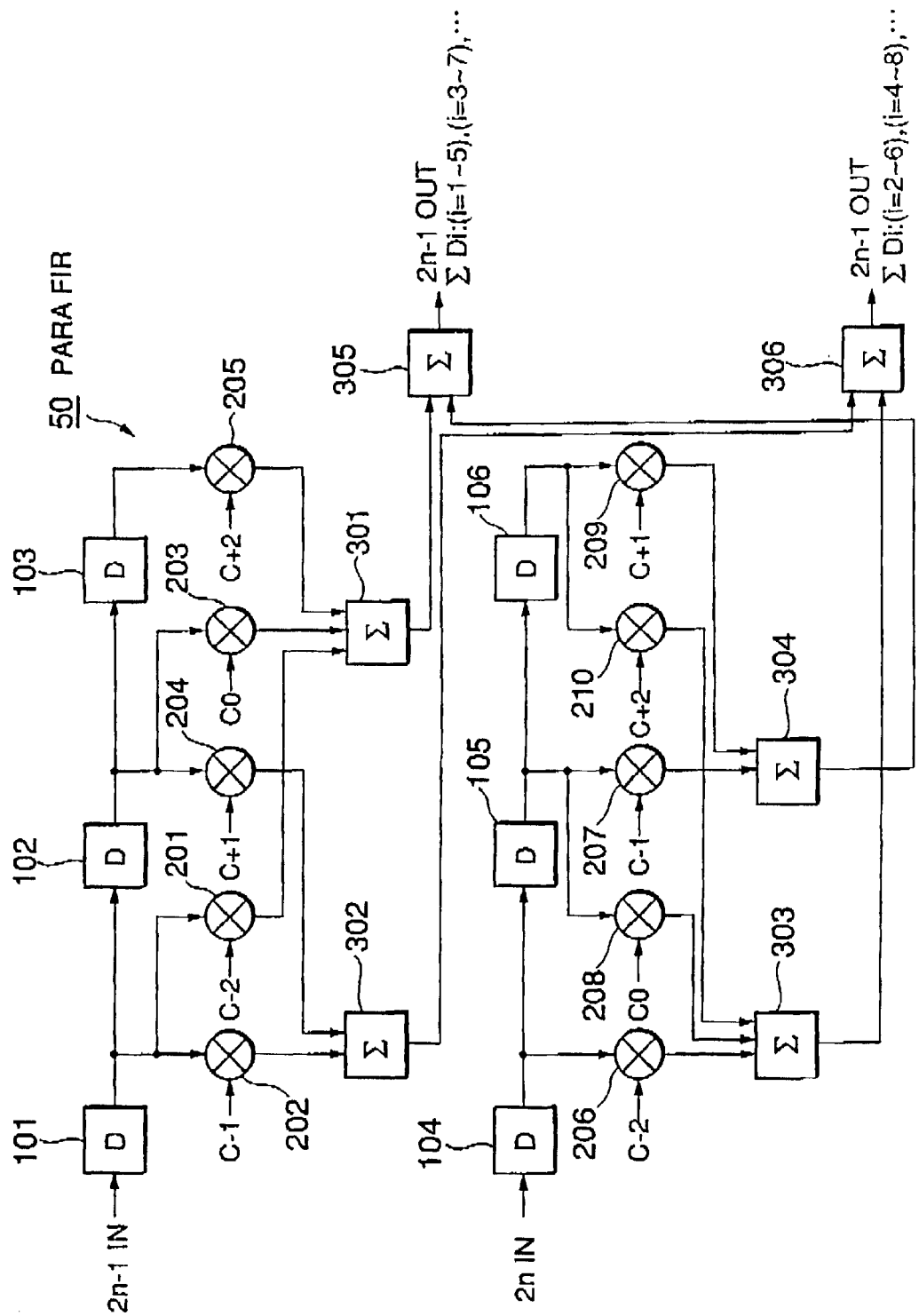
FIG. 2 is a block diagram showing one example of a parallel FIR filter illustrated in FIG. 1.

Referring to FIG. 2, an example of parallel FIR filter 50 has first to sixth delay circuits 101–106, first to tenth multipliers 201–210 with defined first to tenth multiplication coefficients C, and first to sixth adders 301–306. The first to sixth delay circuits 101–106 have as a delay time a time (T=1/fs) equal to a reciprocal of the modulation speed fs.

In order for the parallel FIR filter 50 to operate as the roll-off filter, the multiplication coefficients are equal to discrete impulse response values of the filter. In detail, the multiplication coefficients of the first, fifth, sixth and tenth multipliers are equal to each other (C−2=C+2), and the multiplication coefficients of the second, fourth, seventh and ninth multipliers are equal to each other (C−1=C+1). The multiplication coefficients of the third and eighth multipliers are equal to each other (C0). In this embodiment, the parallel FIR filter 51 has the same configuration and operation as the parallel FIR filter 50.

Further in more detail, the first and fourth delay circuits 101, 104 receive the odd-numbered data signal $D_{2n-1}$ and even-numbered data signal $D_{2n-1}$ respectively. The second and fifth delay circuits 102, 105 receive outputs of the first and fourth delay circuits 101, 104, respectively. The third and sixth delay circuits 103, 106 receive outputs of the second and fifth delay circuits 102, 105, respectively.

The first and second multipliers 201, 202 receive an output of the first delay circuit 101. The third and fourth multipliers 203,204 receive an output of the second delay circuit 102. The fifth multiplier 205 receives an output of the third delay circuit 103. The sixth multiplier 206 receives an output of the fourth delay circuit 104. The seventh and eighth multipliers 207, 208 receive an output of the fifth delay circuit 105. The ninth and tenth multipliers 209, 210 receive an output of the sixth delay circuit 106.

The first adder 301 receives outputs of the first, third and fifth multipliers 201, 203, 205. The second adder 302 receives outputs of the second and fourth multipliers 202, 204. The third adder 303 receives outputs of the sixth, eighth and tenth multipliers 206, 208, 210. The fourth adder 304 receives output of the seventh and ninth multipliers 207, 209. The fifth adder 305 receives outputs of the first and fourth adders 301, 304 and produces as an output of itself a filtered odd-numbered data signal. The sixth adder 306 receives outputs of the second and third adders 302, 303 and produces as an output of itself a filtered even-numbered data signal.

In other words, the circuits that process the odd-numbered data signals and the even-numbered data signals each have five taps 201–205, 206–210. The five taps 201–205 are divided into a group of first, third and fifth taps 201, 203, 205 and a group of second and fourth taps 202, 204. Each group is arranged so that the intervals of its taps are two. Similarly, the taps 206–210 is divided into a group of sixth, eighth and tenth taps 206, 208, 210 and a group of seventh and ninth taps 207, 209. The tap outputs of each group are summed up by the corresponding adders 301, 302, 304, 304. Combinations of the groups of taps corresponding to the odd-numbered data signals and the groups of taps corresponding to the even-numbered data signals are selected so that respective taps do not belong to the same combination, and in each selected combination, the summation results are further summed up. As a result, when the adder 305 outputs calculated results for $D_1$–$D_5$, the adder 306 outputs calculated results for $D_2$–$D_6$. That is, the parallel FIR filter produces outputs corresponding to five consecutive input data bits $D_j$, $D_{j+1}$, $D_{j+2}$, $D_{j+3}$, $D_{j+4}$ (j is an integer) by the computation at speed fs.

Referring again to FIG. 1, a parallel EPS (Endless Phase Shifter) 60, a phase detector for carrier wave 61, a loop filter 62, and the NCO (Numerical Controlled Oscillator) 63 comprise a carrier wave regeneration loop. Among them, the phase detector-for carrier wave 61, the loop filter 62 and the NCO 63 generate an error signal representing a phase error for carrier wave.

More in detail, the parallel EPS 60 receives a pair of filtered P-channel odd-numbered and even-numbered data signals and a pair of filtered Q-channel odd-numbered and even-numbered data signals, carries out the phase shifting by using the error signal, and outputs first to fourth phase-shifted signals. The first and second phase-shifted signals correspond to the filtered P-channel odd-numbered and even-numbered data signals. The third and fourth phase-shifted signals correspond to the filtered Q-channel odd-numbered and even-numbered data signals. The parallel EPS 60 in this way removes at the processing speed equal to the modulation speed fs, the phase shift (rotation) remaining in the analog-like quadrature detection.

Figure 3:
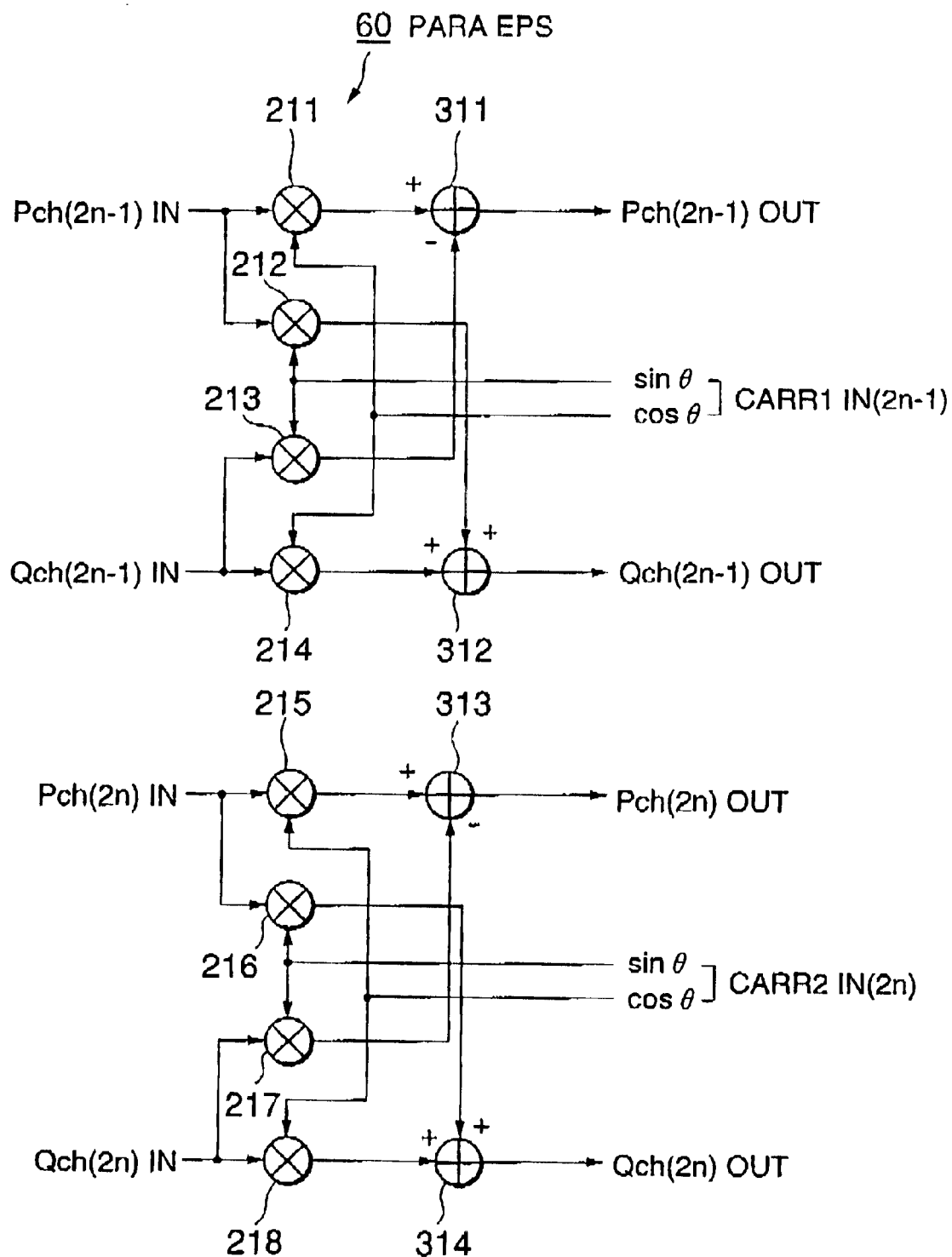
FIG. 3 is a block diagram showing one example of a parallel EPS illustrated in FIG. 1.

Referring to FIG. 3, the parallel EPS 60 has two complex multipliers for the odd-numbered data signal ($D_{2n-1}$) and for the even-numbered data signal ($D_{2n}$). The two complex multipliers correspond to the odd-numbered data signal ($D_{2n-1}$) and the even-numbered data signal ($D_{2n}$), respectively.

The complex multiplier that processes the odd-numbered data signal ($D_{2n-1}$) has multipliers 211–214, a subtractor 311 and an adder 312, and removes the phase shift by using a first digital carrier wave signal CARR1 entered from NCO 63 as an error signal that corresponds the odd-numbered data signal ($D_{2n-1}$).

In detail, the multiplier 211 multiplies the P-channel odd-numbered data signal by a cosine component of the first digital carrier wave signal CARR1. The multiplier 213 multiplies the Q-channel odd-numbered data signal by a sine component of the first digital carrier wave signal CARR1. The subtractor 311 subtracts the output of the multiplier 213 from the output of the multiplier 211, and outputs a P-channel odd-numbered data signal in which the phase rotation is removed. Similarly, the multiplier 214 multiplies the Q-channel odd-numbered data signal by a cosine component of the first digital carrier wave signal CARR1. The multiplier 212 multiplies the P-channel odd-numbered data signal by a sine component of the first digital carrier wave signal CARR1. The adder 312 adds the output of the multiplier 214 and the output of the multiplier 212, and outputs the Q-channel odd-numbered data signal in which the phase rotation is removed.

The complex multiplier that processes the even-numbered data signal ($D_{2n}$) has multipliers 215–218, a subtractor 313 and an adder 314, and removes the phase shift by using a second digital carrier wave signal CARR2 entered from the NCO 63 as an error signal that corresponds to the even-numbered data signal ($D_{2n}$). Its operation is similar to that performed in the processing of the odd-numbered data signal.

In this way, the parallel EPS 60 outputs a set of P-channel and Q-channel odd-numbered data signals and a set of P-channel and Q-channel even-numbered data signals. Of these two sets of parallel outputs, signals at a timing corresponding to the opening of the eye pattern are the P-channel and Q-channel demodulated signals.

Referring again to FIG. 1, the carrier phase detector 63 monitors the P-channel and Q-channel demodulated signals to detect phase shifts that is from a reference point to the demodulated signals. The operation speed of the carrier phase detector 63 is equal to the modulation speed fs.

The phase shift detected by the carrier phase detector 63 is delivered through the loop filter 62 to the NCO 63.

Figure 4:
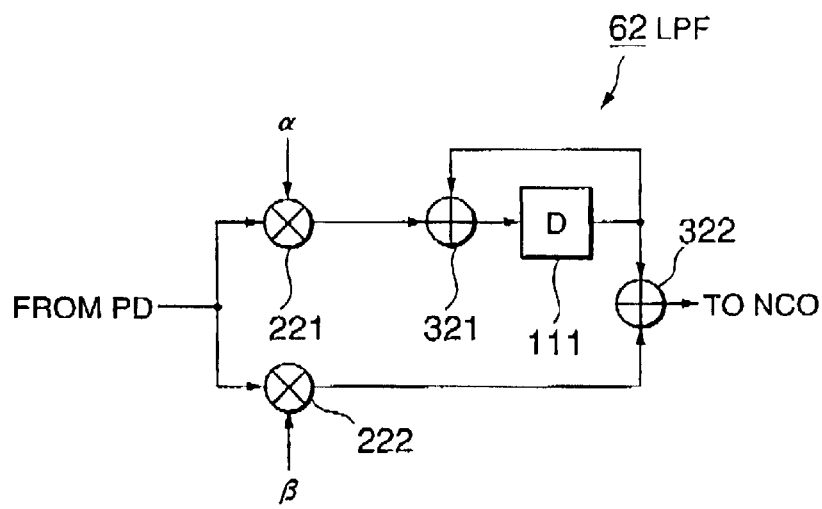
FIG. 4 is a block diagram showing one example of an LPF in the carrier wave reproduction loop illustrated in FIG. 1.

Referring to FIG. 4, the illustrated loop filter 62 is of a second-degree complete integration type, and has two multipliers 221, 222, two adders 321, 322 and a delay 111. The multipliers 221, 222 multiply the output of the phase detector 63 by parameters $\alpha$ and $\beta$, respectively, the parameters determining the loop characteristics. The output of the multiplier 211 is further cumulatively added by the adder 321 and the delay 111. That is, the adder 321 and the delay 111 constitute an integrator. The adder 322 adds the output of the delay 111 and the output of the multiplier 222, and thereby, produces an output of the loop filter 62. In this embodiment, the processing speed of this loop filter is equal to the modulation speed fs.

Figure 5:
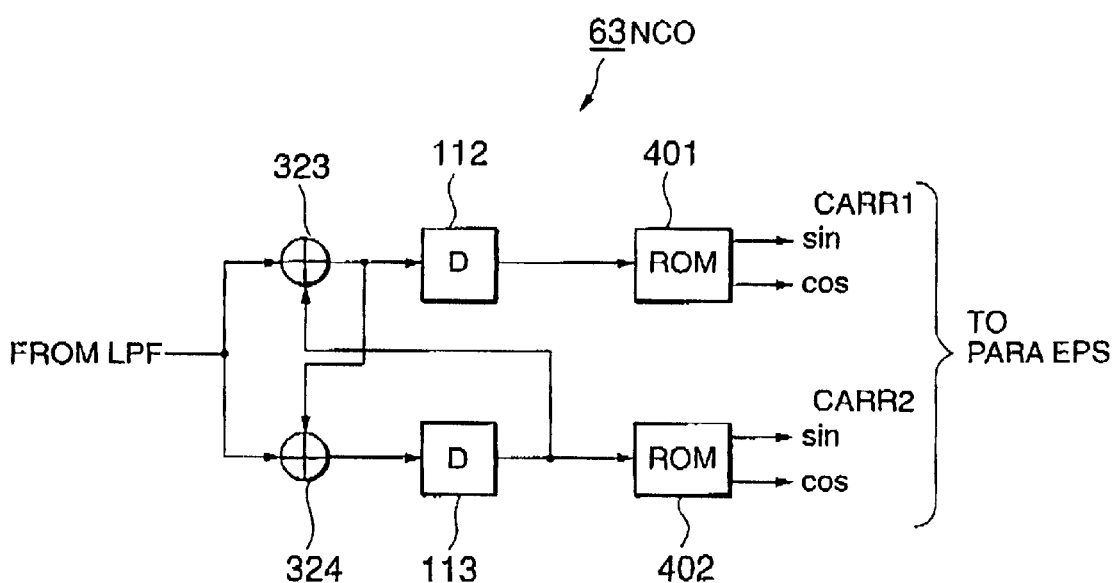
FIG. 5 is a block diagram showing one example of an NCO illustrated in FIG. 1.

Referring to FIG. 5, the NCO 63 has adders 323, 324, delays 112, 113 and ROMs 401, 402, and is arranged to suit parallel processing. The adders 323, 324 and the delays 112, 113 form two cumulative adders so that an output of one of the cumulative adders has an influence on an output of the other. Although the output of the loop filter 62 corresponds to the frequency, the output of the loop filter 62 is integrated by the cumulative adders and is converted into a quantity corresponding to the phase. The ROMs 120, 121 store sets of phase and data of the digital carrier wave signal CARR1, CARR2 precalculated to correspond to the phases, more specifically, the sine/cosine component data corresponding to the phases, with the phase and the data are linked with each other. In actual, the ROMs 120, 121 have the same contents. When given phases from the delays 112, 113, the ROMs 120, 121 use the phases as addresses and output the corresponding the digital carrier wave signals CARR1, CARR2. The digital carrier signals CARR1, CARR2 are supplied to the NCO 63, as described above.

Referring again to FIG. 1, a clock phase detector 70, a loop filter 71, a D/A converter 72, a VCO 73, A/D converters 30, 31, S/P converters 40, 41, parallel FIR filters 50, 51 and a parallel EPS 60 comprise a clock synchronization loop.

Figure 6:
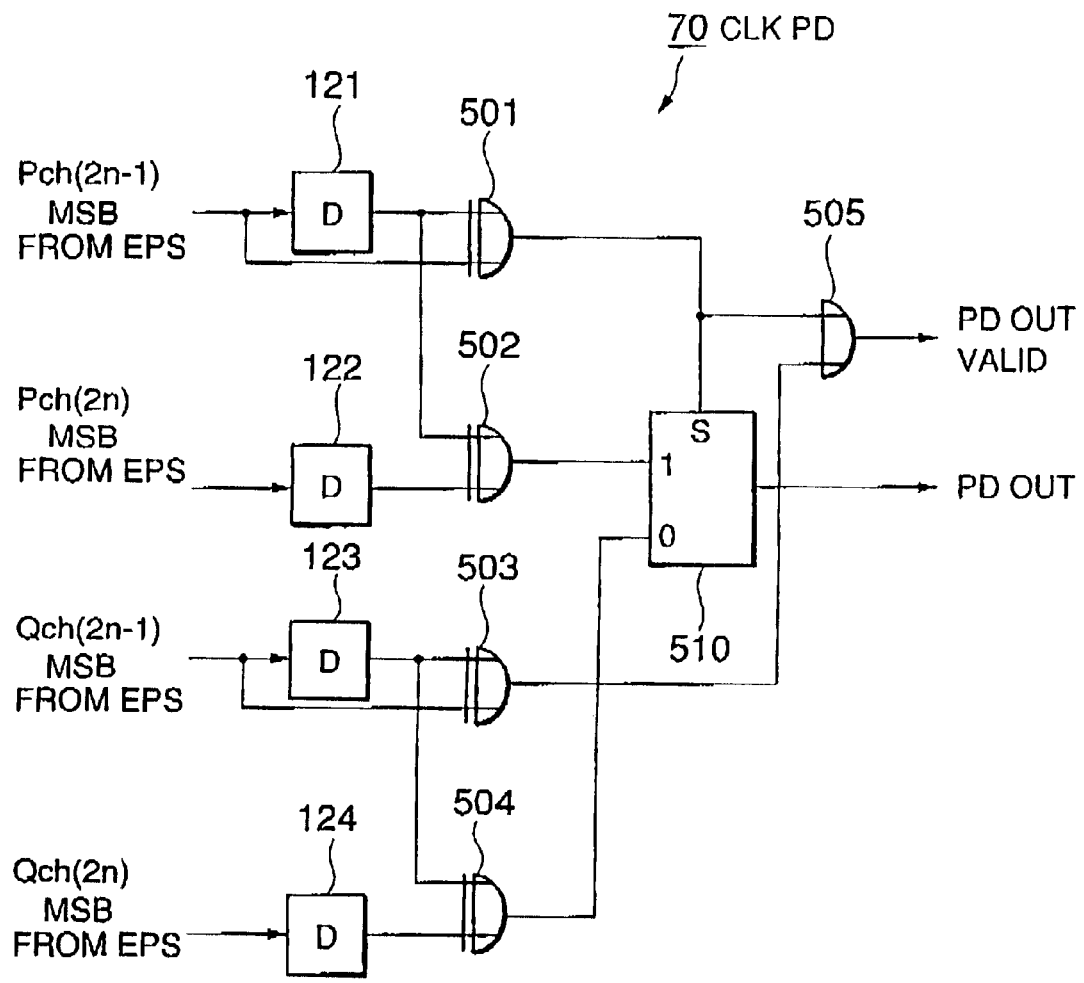
FIG. 6 is a block diagram showing one example of a clock phase detector illustrated in FIG. 1.

Referring to FIG. 6, the clock phase detector 70 has delays 121–124, EX-OR gates 501–504, an OR gate 505 and a F/F 510.

Among them, the delay 121 and the EX-OR gate 501 mainly serves to detect a condition for obtaining the P-channel clock phase. The delay 123 and EX-OR gate 503 mainly serves to detect a condition for obtaining the Q-channel clock phase. For either P-channel or Q-channel, the condition for obtaining the clock phase is that, in three consecutive data signals, the first data signal and the third data signal have opposite polarities. That is, if we let three consecutive data signals be D1, D2 and D3, the MSBs of D1 and D3 have to differ from each other. The illustrated clock phase detector 70 carries out the judgement of the condition by referencing the MSBs of the odd-numbered data signals ($D_{2n-1}$).

The delay 122 and EX-OR gate 502 mainly serve to detect the P-channel clock phase information together with the delay 121. Similarly, the delay 124 and EX-OR gate 504 mainly serve to detect the Q-channel clock phase information together with the delay 123. In more concrete terms, for either P-channel or Q-channel, the clock phase detector 70 judges that the phase is leading if D2 and D1 have the same polarities and that the phase is lagging if D2 and D1 have different polarities, and then produces as phase information the result of decision.

In particular, in the clock phase detector 70 of this embodiment, the OR gate 505 produces an OR of the outputs of the EX-OR gates 501 and 503 as information indicating whether the above-described condition is met. Thus, the output of the OR gate 505 is "1 (valid)" when the above-described condition is met for either P-channel or Q-channel or both.

Figure 7:
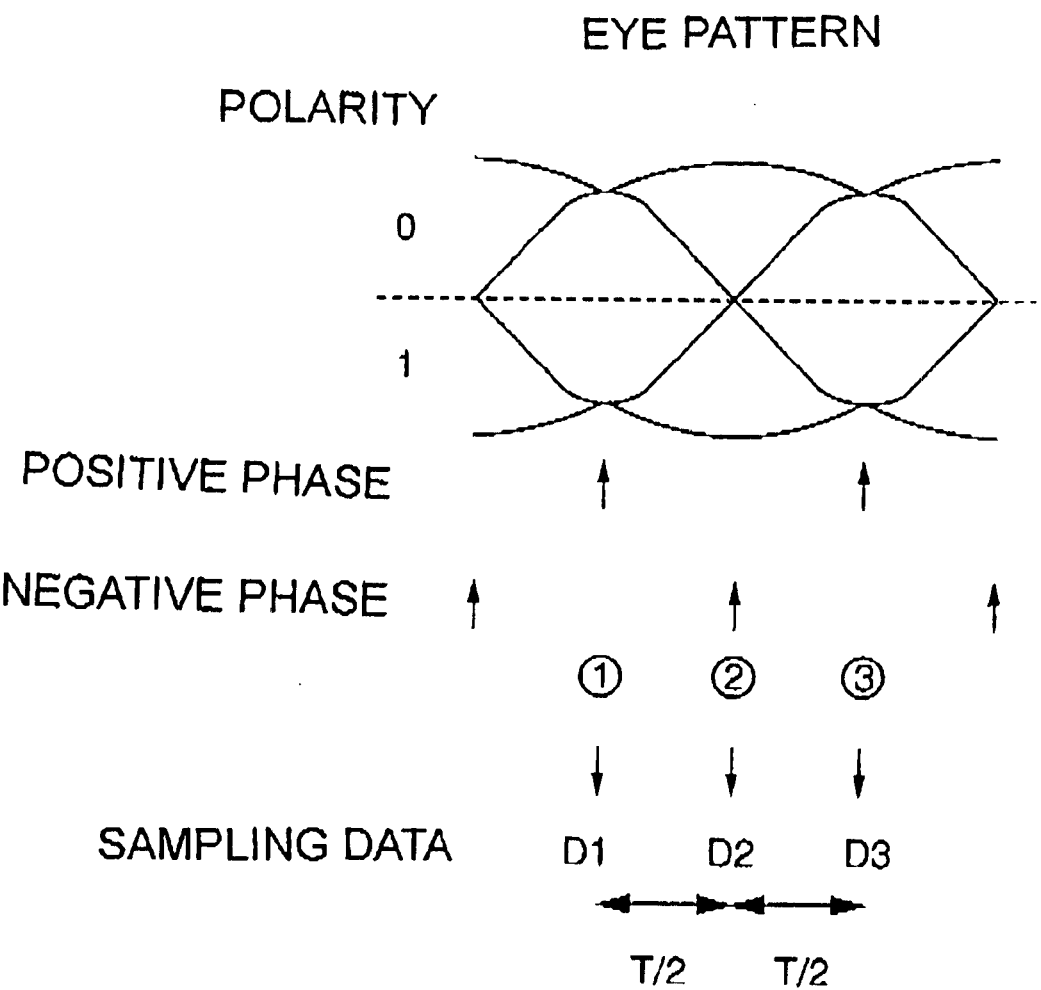
FIG. 7 is a diagram used to explain a phase detection in a clock phase detector in illustrated in FIG. 6.

FIG. 7 shows the relationship between the three consecutive data signals D1–D3 and the eye pattern. The data signals D1–D3 sampled in the A/D converter 30 (31) appear every sampling period Ts/2 (=½fs). Then, when the signal is serial-parallel converted by the S/P converter 40 (41), D1 and D2 become parallel and at the same time the interval between D1 and D3 remains at Ts. If the polarities of D1 and D3 are opposite, there is a zero-cross point somewhere in between. The clock control is carried out with the phase information detected as described above, resulting in that the clock phase associated with D2 matches the zero-cross point.

Only when the output of the clock phase detector 70 indicates "valid", the loop filter 71 carries out the filtering operation in response to the phase information output from the F/F 510. Because the loop filter 71 itself functions in the similar manner to the loop filter 62 in the carrier wave regeneration loop, it has a circuit configuration shown in FIG. 4. It is noted however that because the loop filter 71 and the loop filter 62 have different loop characteristics, their coefficients α and β are not necessarily the same.

The VCO 73 receives the output of the loop filter 71 through the D/A converter 72, and generates a sampling clock to supply it to the A/D converters 30, 31. As can be seen from the arrangement, the illustrated VCO 73 is an analog circuit. This is due to the following reason. In order to carry out the clock synchronization with the digital signal processing, it is required to use a clock with much higher frequency than the modulation speed fs. Hence, in the case where the modulation speed fs is in excess of, for example, 10 MHz, it is difficult to digitize the VCO. If the modulation speed fs is a low frequency, the digital VCO may be used instead of the D/A converter 72 and VCO 73.

In this way, the clock phase detector 70 detects the phase relation between the analog base band signal and the sampling clock, and the oscillation frequency of the VCO 73 is controlled in accordance with to the result of detection, so that the clock phase is always optimum for sampling. Such a clock phase control is disclosed in Japanese Patent No. 2848420, which is incorporated herein by reference.

As described above, the demodulator according to the first embodiment carries out the A/D conversion followed by the S/P conversion, and therefore, can perform the demodulation processing at a speed equal to the modulation speed fs, not at the sampling rate of 2 fs.

Figure 8:
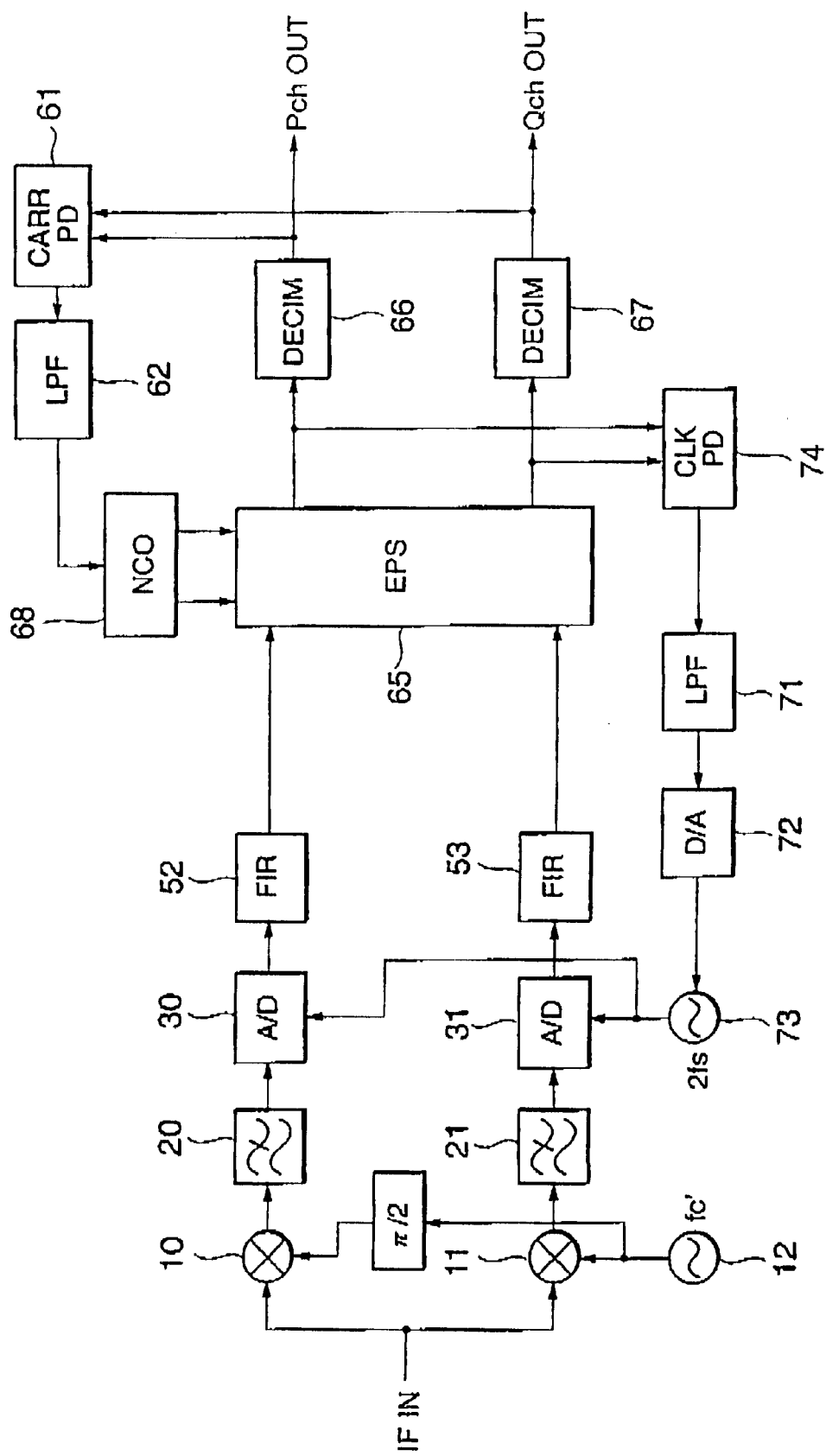
FIG. 8 is a block diagram showing a demodulator for comparison, in which the demodulation is carried out at two times the modulation speed.

For the sake of clarity, the demodulator of FIG. 8 is explained as an example of comparison. The demodulator of the comparison example does not carry out the S/P conversion after the A/D conversion. Hence, the FIR filters 52, 53 and EPS 65 operate at the sampling rate of 2 fs.

Figure 9:
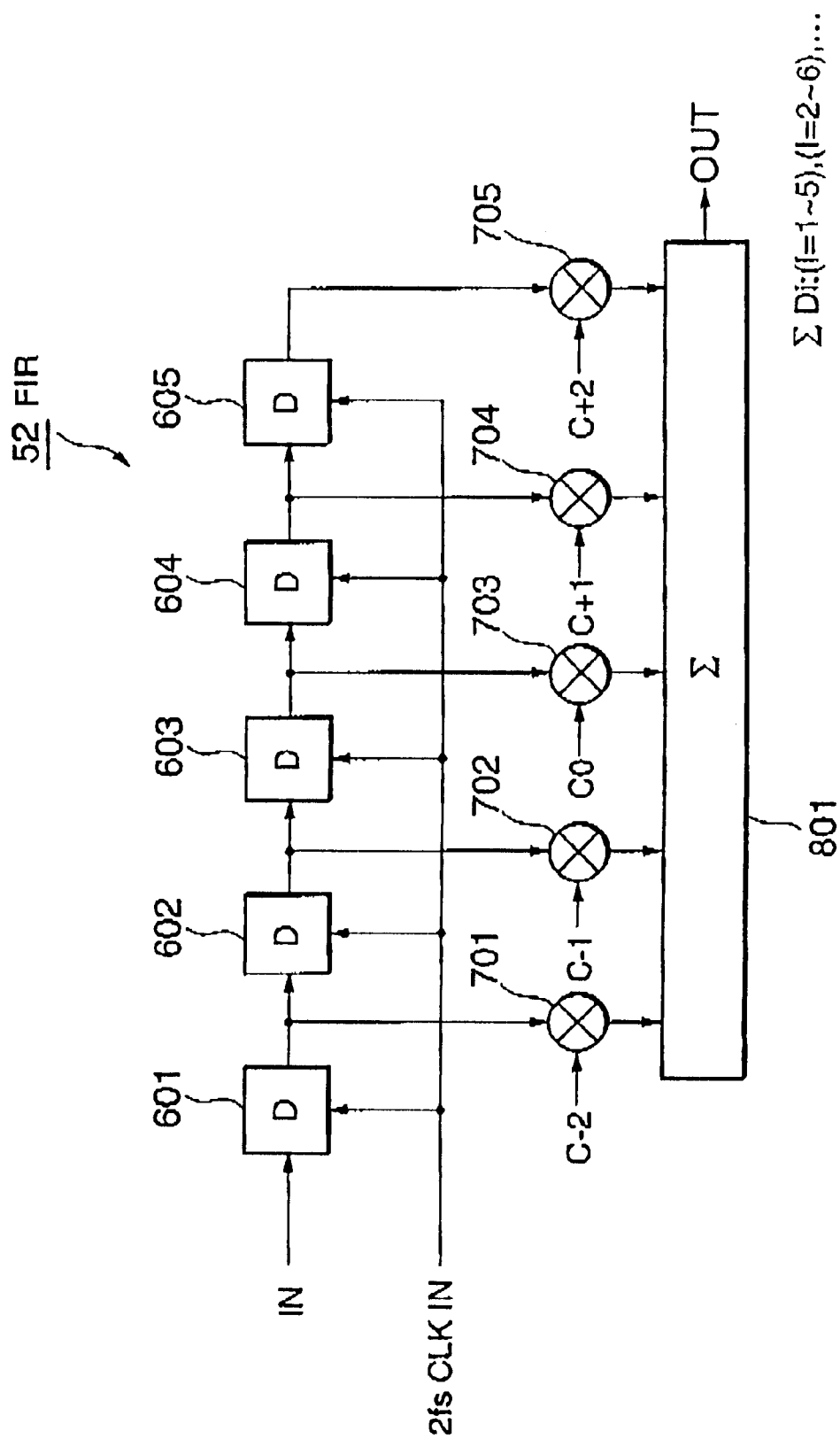
FIG. 9 is a diagram showing a structure of the FIR filter illustrated in FIG. 8.

In detail, the FIR filter 52 has delays 601–605, multipliers 701–705 and an adder 801, as shown in FIG. 9. The delay times in the delays 601–605 are not a reciprocal of the modulation speed fs but is equal to a reciprocal of the sampling rate 2 fs. That is, the FIR filter 52 operates at two times the speed of the parallel FIR filter 50 of FIG. 2.

Figure 10:
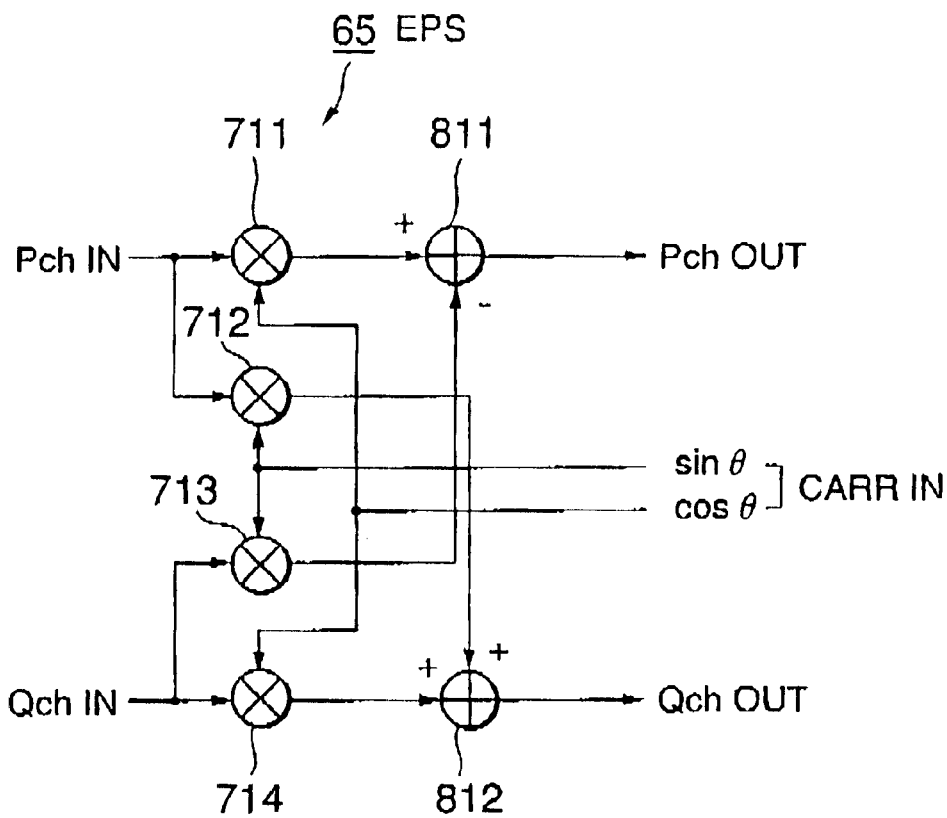
FIG. 10 is a diagram showing a structure of the EPS illustrated in FIG. 8.

As shown in FIG. 10, the EPS 65 consists of a single complex multiplier which comprises multipliers 711–714, a subtractor 811 and an adder 812. The data rate of the input/output signal of this complex multiplier is two times the modulation speed. That is, the EPS 65 operates at two times the speed of the parallel EPS 60 of FIG. 3.

Figure 11:
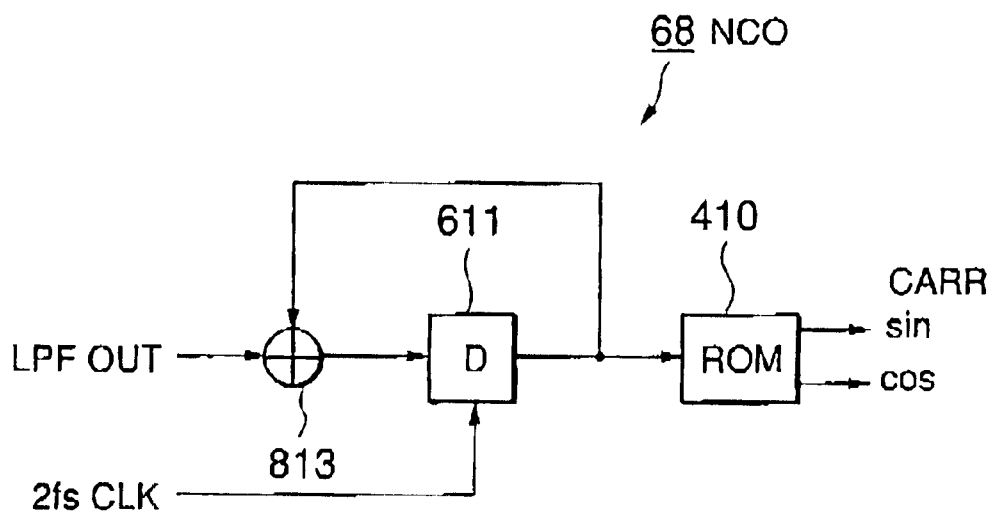
FIG. 11 is a diagram showing a structure of the NCO illustrated in FIG. 8.

Therefore, in order to supply the carrier wave signal CARR to the EPS 65 at a data rate of 2fs, the NCO 68 must operate at a clock of 2 fs, as shown in FIG. 11. In detail, the NCO 68 has an adder 813, a delay 611 and a ROM 410. The adder 813 cumulatively adds the output of the delay 611, and thus the adder 813 and the delay 611 comprise an integrator. The information stored in the ROM 410 is the same information stored in the ROMs 401, 402 shown in FIG. 5.

Figure 12:
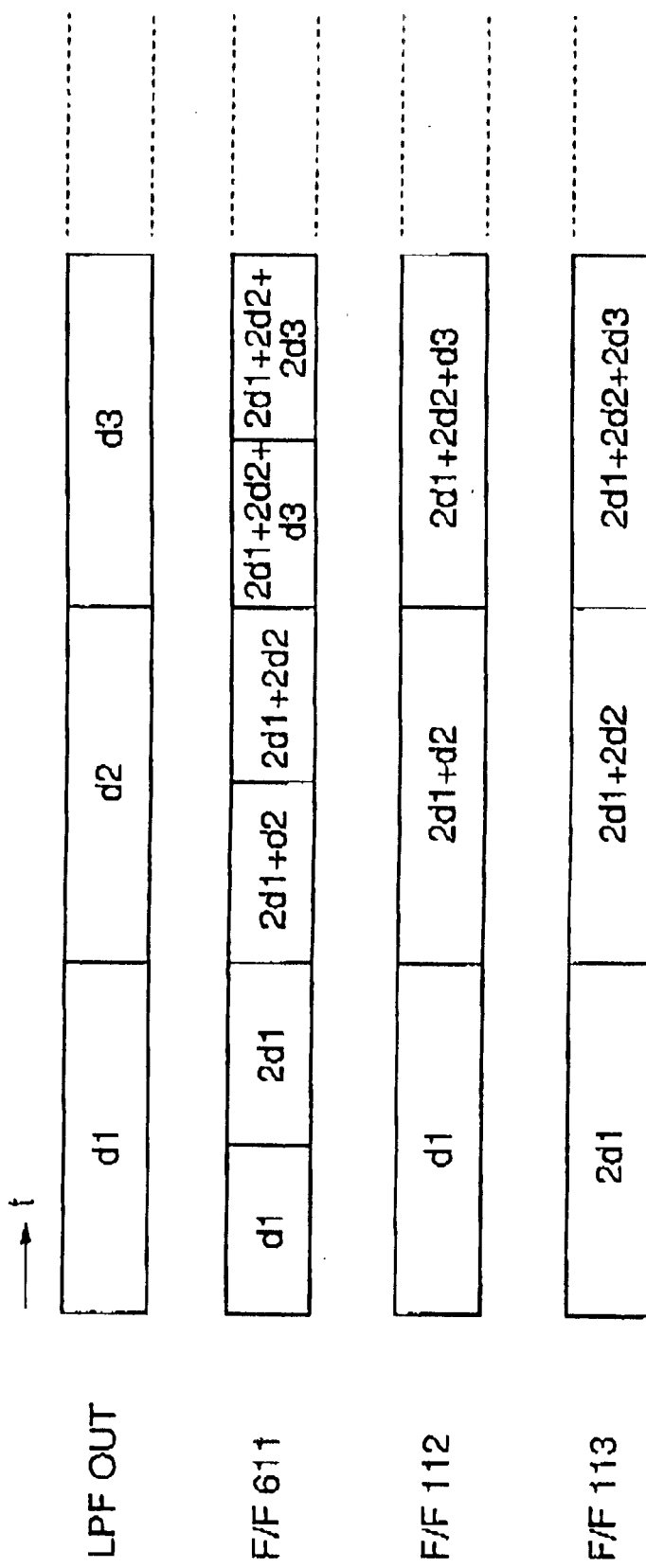
FIG. 12 is a diagram showing a relation among data stored in a delay (F/F) included in the NCO of FIGS. 5 and 11.

Referring to FIG. 12, the relation between the data held by the delay 611 of FIG. 11 and the data held by the delays 112, 113 of FIG. 5 is shown. As can be seen from FIG. 12, the odd-numbered data held by the delay 611 of FIG. 11 is held by the delay 112 of FIG. 5, while the even-numbered data held by the delay 611 of FIG. 11 is held by the delay 113 of FIG. 5.

Referring again to FIG. 8, culling circuits 66, 67 are provided posterior to the EPS 65. The outputs of the EPS 65 are culled for every single sample by the culling circuits 66, 67, and are changed into demodulated signals.

Figure 13:
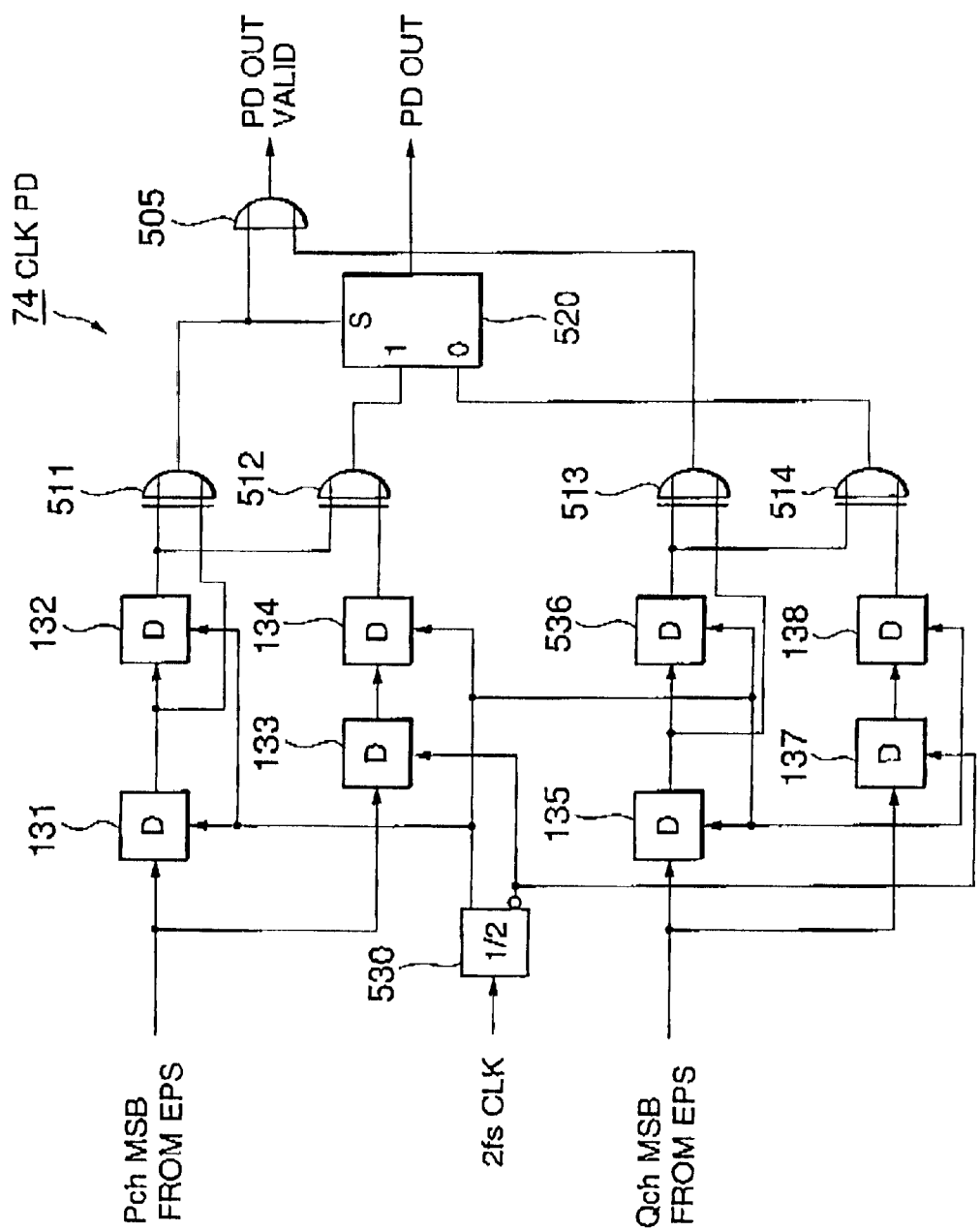
FIG. 13 is a diagram showing a structure of the clock phase detector illustrated in FIG. 8.

Referring to FIG. 13, the structure of a clock phase detector 74 is shown. The clock phase detector 74 basically has the same function as the clock phase detector 70. It is noted however that because the input to the clock phase detector 74 has two times the data rate of the input to the clock phase detector 70, the clock phase detector 74 alternately operates the delay corresponding to the odd-numbered data signal and the delay corresponding to the even-numbered data signal by using the positive-phase-sequence output and the negative-phase-sequence output of a half-divider circuit 530. Thereby, the clock phase detector 74 lowers the data rate down to the modulation speed and then carries out the judgement of the condition and the detection of the phase information.

Thus, the demodulator shown in FIG. 8 has constitutional elements that need to be operated at two times the modulation speed in all of the roll-off filter, the carrier wave regeneration loop and the clock synchronization loop, but the demodulator of FIG. 1 can operate all the constitutional elements at a speed equal to the modulation speed. Hence, the demodulator of FIG. 1 is more suited for high-speed communication systems than the demodulator of FIG. 8.

Now, other examples of the parallel FIR filters 50, 51 will be explained with reference to FIGS. 14 to 17.

Figure 14:
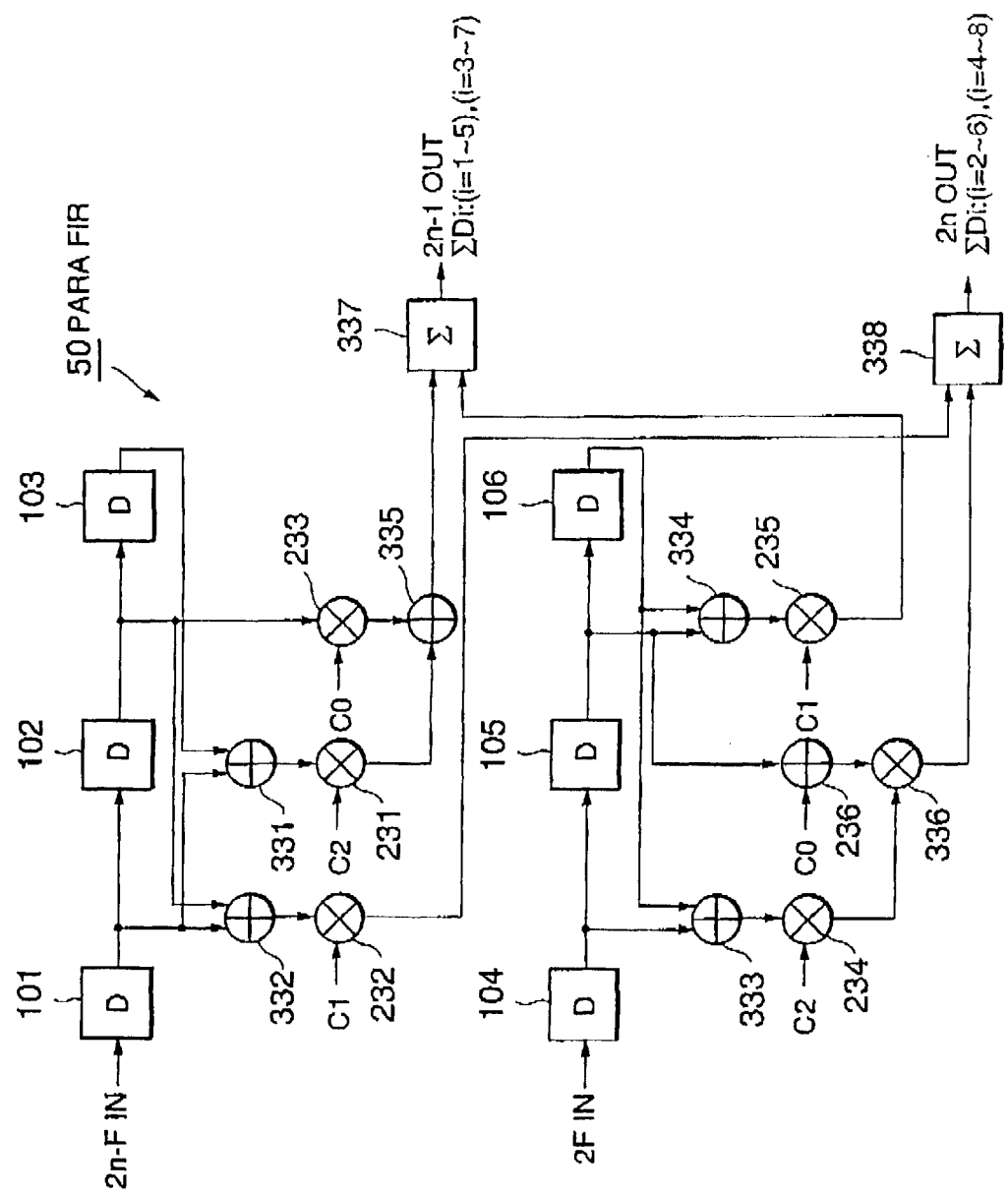
FIG. 14 Is a block diagram showing another example of the parallel FIR filter illustrated in FIG. 1.

The parallel FIR filter shown in FIG. 14 is a variation of the parallel FIR filter of FIG. 2. For the parallel FIR filter 50 to function as a roll-off filter, the coefficients of Its multipliers meet the following condition: C+n=C−n. In the parallel FIR filter shown in FIG. 14, the inputs of the multipliers, that have the same multiplication coefficients in the multipliers shown in FIG. 2, are summed up in advance, and thereby, the number of multipliers is reduced. As a result, in the case of forming a parallel FIR filter having the same function as a serial FIR filter with 2n+1 taps, 4n+2 taps are necessary to realize the parallel FIR filter in the same way as the parallel FIR filter of FIG. 2. But, to implement the parallel FIR filter in the same way of the parallel FIR filter shown in FIG. 14, only 2N+2 taps are required.

In more concrete terms, the parallel FIR filter of FIG. 14 has first to sixth delay circuits 101–106, first to sixth multipliers 231–236 and first to eighth adders 331–338. The first to sixth delay circuits 101–106 are the same as those shown in FIG. 2 and their delay times are T=1/fs. The coefficients of the first and fourth multipliers 231, 234 are equal to each other, and the coefficients of the second and fifth multipliers 232, 235 are equal to each other. Further, the coefficients of the third and sixth multipliers 233, 236 are equal to each other.

The first and fourth delay circuits 101, 104 receive the odd-numbered data signal ($D_{2n-1}$) and the even-numbered data signal ($D_{2n}$), respectively. The second and fifth delay circuits 102, 105 receive the outputs of the first and fourth delay circuits 101, 104, respectively. The third and sixth delay circuits 103, 106 receive the outputs of the second and fifth delay circuits 102, 105, respectively.

The first adder 331 receives the outputs of the first and third delay circuits 101, 103. The second adder 332 receives the outputs of the first and second delay circuits 101, 102. The third adder 333 receives the outputs of the fourth and sixth delay circuits 104, 106. The fourth adder 334 receives the outputs of the fifth and sixth delay circuits 105, 106.

The first multiplier 231 receives the output of the first adder 331. The second multiplier 232 receives the output of the second adder 332. The third multiplier 233 receives the output of the second delay circuit 102. The fourth multiplier 234 receives the output of the third adder 333. The fifth multiplier 235 receives the output of the fourth adder 334. The sixth multiplier 236 receives the output of the fifth delay circuit 105.

The fifth adder 335 receives the outputs of the first and third multipliers 231, 233. The sixth adder 336 receives the outputs of the fourth and sixth multipliers 234, 236. The seventh adder 337 receives the outputs of the fifth adder 335 and the fifth multiplier 235, and produces as an output of itself a filtered odd-numbered data signal. The eighth adder 338 receives the outputs of the sixth adder 336 and the second multiplier 232, and produces as an output of itself a filtered even-numbered data signal.

Figure 15:
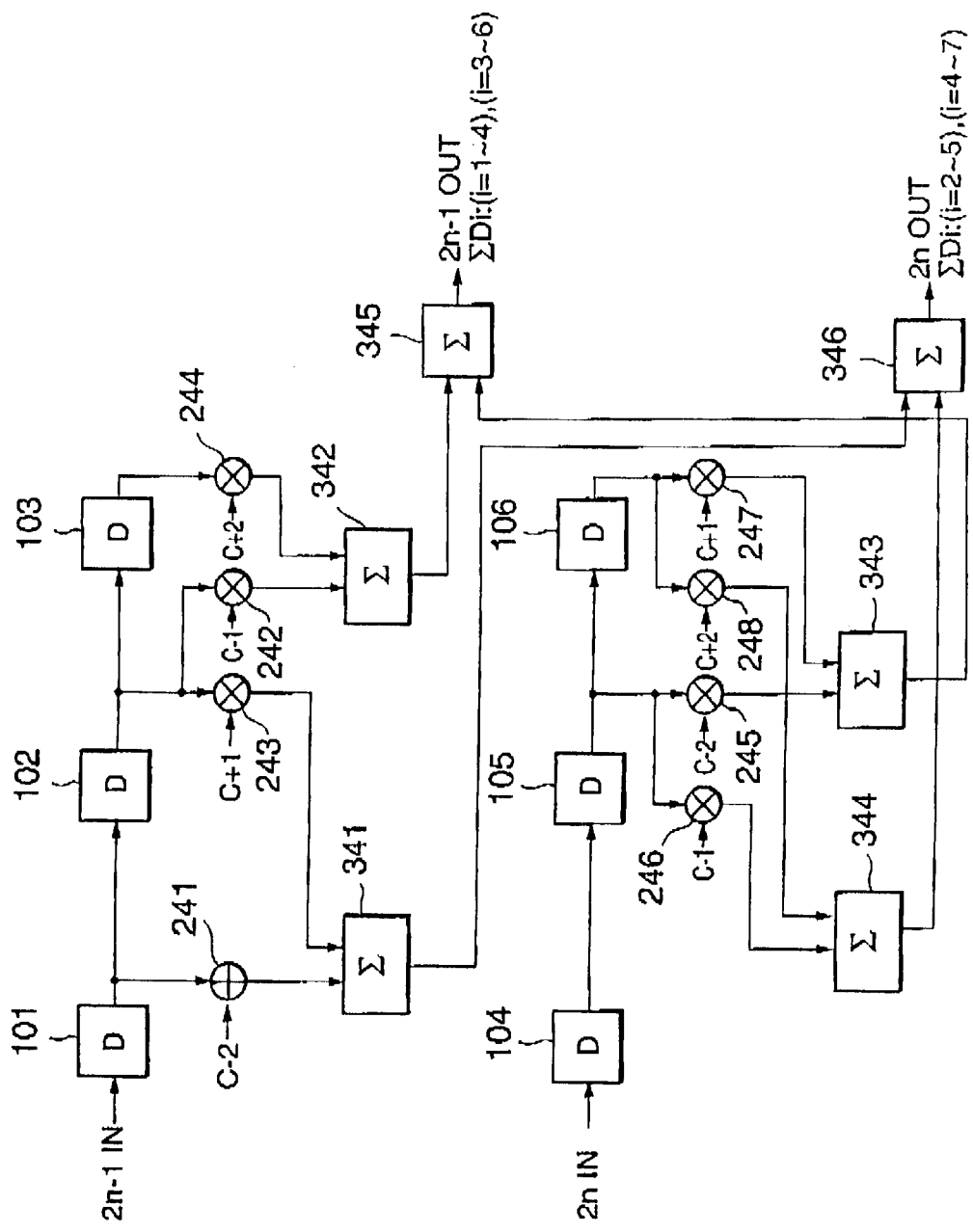
FIG. 15 is a block diagram showing a further example of the parallel FIR filter illustrated in FIG. 1.

While the parallel FIR filters shown in FIG. 2 and FIG. 14 have an odd number of taps, the parallel FIR filter shown in FIG. 15 has an even number of taps. Specifically, the parallel FIR filter of FIG. 15 produces, by operation at the speed fs, outputs corresponding to four consecutive input data bits $D_j$, $D_{j+1}$, $D_{j+2}$, $D_{j+3}$ (j is an integer).

In detail, the parallel FIR filter shown in FIG. 15 has first to sixth delay circuits 106–106, first to eighth multipliers 241–248 and first to sixth adders 341–346. The first to sixth delay circuits 101–106 are the same as those shown in FIG. 2 and their delay times are T=1/fs. The coefficients of the first, fourth, fifth and eighth multipliers 241, 244, 245, 248 are equal to each other, and the coefficients of the second, third, sixth and seventh multipliers 242, 243, 246, 247 are equal to each other.

The first and fourth delay circuits 101, 104 receive the odd-numbered data signal ($D_{2n-1}$) and the even-numbered data signal ($D_{2n}$), respectively. The second and fifth delay circuits 102, 105 receive the outputs of the first and fourth delay circuits 101, 104, respectively. The third and sixth delay circuits 103, 106 receive the outputs of the second and fifth delay circuits 102, 105, respectively.

The first multiplier 241 receives the output of the first delay circuit 101. The second and third multipliers 242, 243 receive the output of the second delay circuit 102. The fourth multiplier 104 receives the output of the third delay circuit 103. The fifth and sixth multipliers 105, 106 receive the output of the fifth delay circuit 105. The seventh and eighth multipliers 107, 108 receive the output of the sixth delay circuit 106.

The first adder 341 receives the outputs of the first and third multipliers 241, 243. The second adder 342 receives the outputs of the second and fourth multipliers 242, 244. The third adder 343 receives the outputs of the fifth and seventh multipliers 245, 247. The fourth adder 344 receives the outputs of the sixth and eighth multipliers 246,248.

The fifth adder 345 receives the outputs of the second and third adders 342, 343, and produces as an output of the fifth adder 345 a filtered odd-numbered data signal. The sixth adder 346 receives the outputs of the first and fourth adders 341, 344, and produces as an output of the sixth adder 346 a filtered even-numbered data signal.

The parallel FIR filters shown in FIGS. 2, 14 and 15 carry out two-parallel processing and, for example, can be adopted in the case where the sampling rate is two times the modulation speed. On the other hand, the parallel FIR filter shown in FIG. 16 carries out four-parallel processing and, for example, can be adopted in the case where the sampling rate is four times the modulation speed.

Under the condition that the sampling rate is four times the modulation speed, the S/P converter converts one serial signal into a set of four parallel signals $D_{4n-3}$, $D_{4n-2}$, $D_{4n-1}$, $D_{4n}$ with a data ratio of 1:4.

Figure 16:
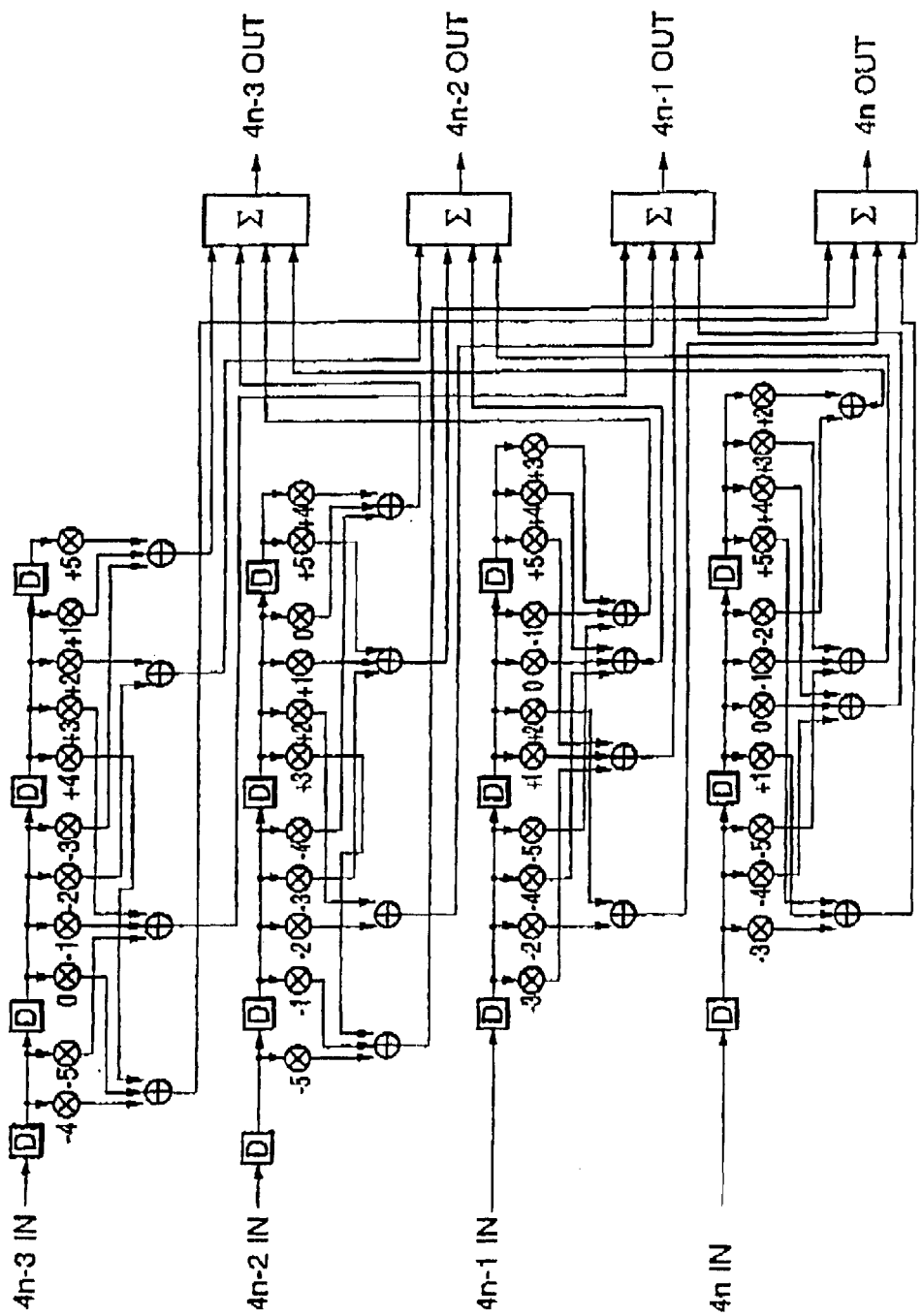
FIG. 16 is a block diagram showing an example of the parallel FIR filter in the case where the sampling rate is four times the modulation speed.

The parallel FIR filter shown in FIG. 16 has 11 taps for each of four parallel signals $D_{4n-3}$, $D_{4n-2}$, $D_{4n-1}$, $D_{4n}$. Each 11 taps are divided into four groups, each group arranged so that the tap interval is four. The outputs of a total of 16 groups are added by one of four adders provided at the final stage. At this time, one of the tap groups is selected from each stage and the selected groups are combined so that the respective tap coefficients do not belong to the same combined group. With this structure, the four adders at the final stage simultaneously output the calculated results, for example, in relation to $D_1$–$D_{11}$, $D_2$–$D_{12}$, $D_3$–$D_{13}$, and $D_4$–$D_{14}$. Thus, the parallel FIR filter shown in FIG. 16 produces, by the operation at the speed of fs, outputs corresponding to the eleven consecutive input data bits.

The parallel FIR filter shown in FIG. 16 has four output signals. Into the EPS that is provided at the latter stage of the parallel FIR filter, only two of these four signals are needed to input, in order to obtain the clock phase information at an output stage of the EPS. For example, if in FIG. 16 only $D_{4n-3}$ and $D_{4n-1}$ or only $D_{4n-2}$ and $D_{4n}$ are entered into the EPS, the EPS can use the same configuration as described above. In this case, the combinations of $D_{4n-2}$ and $D_{4n}$ and of $D_{4n-1}$ that were not selected may be discarded.

Figure 17:
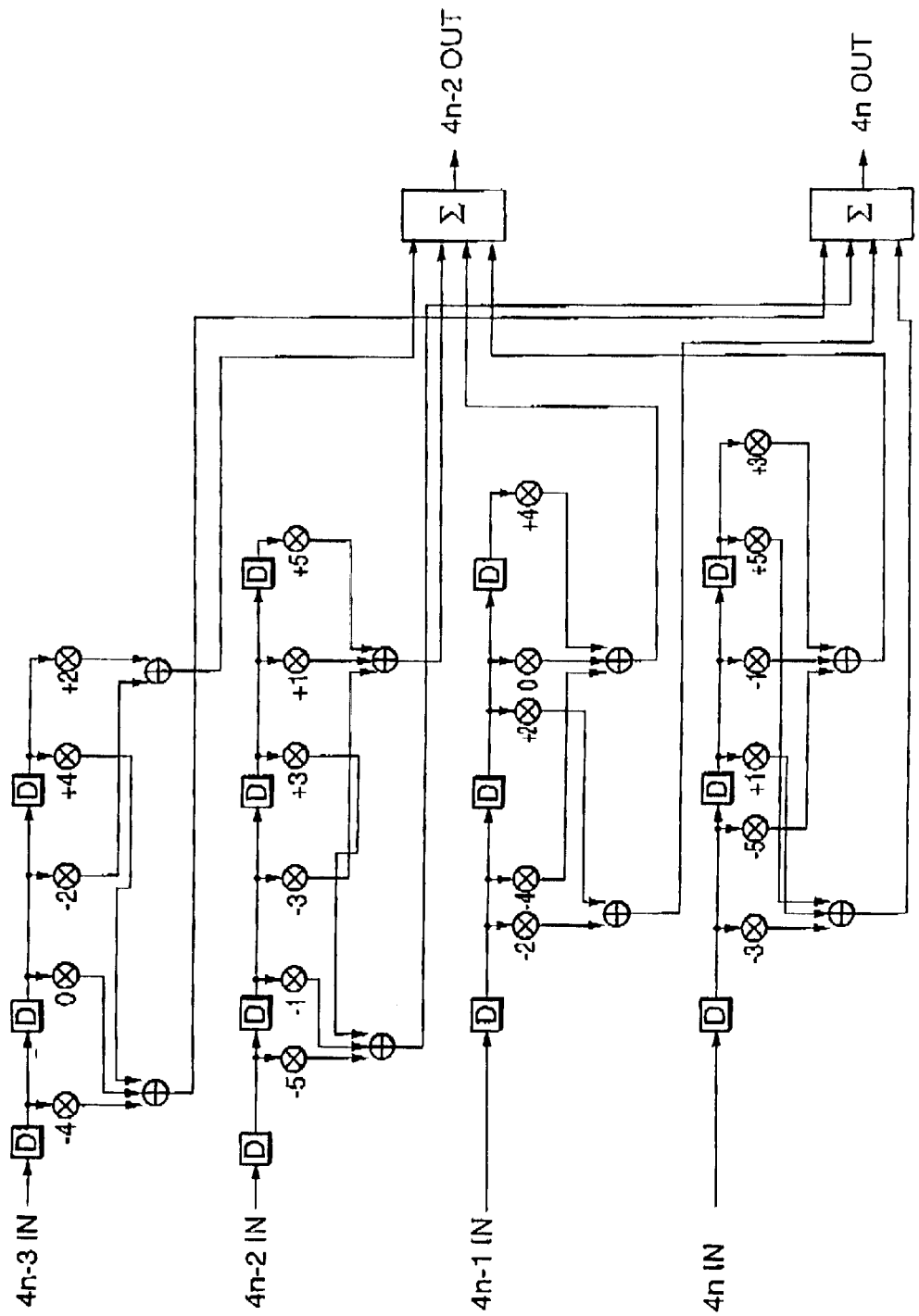
FIG. 17 is a diagram showing a variation of the parallel FIR filter Illustrated in FIG. 16.

Referring to FIG. 17, an illustrated parallel FIR filter is a variation of the parallel FIR filter shown In FIG. 16, under the condition that the outputs $D_{4n-3}$ and $D_{4n-1}$ are not selected but are discarded. The parallel FIR filter shown in FIG. 17 has the configuration where the multipliers, adders and delay circuits associated only with the outputs of $D_{4n-3}$ and $D_{4n-1}$ of the parallel FIR filter of FIG. 16 are omitted. For this parallel FIR filter, it is possible to adopt a simplified method shown in FIG. 14.

Figure 18:
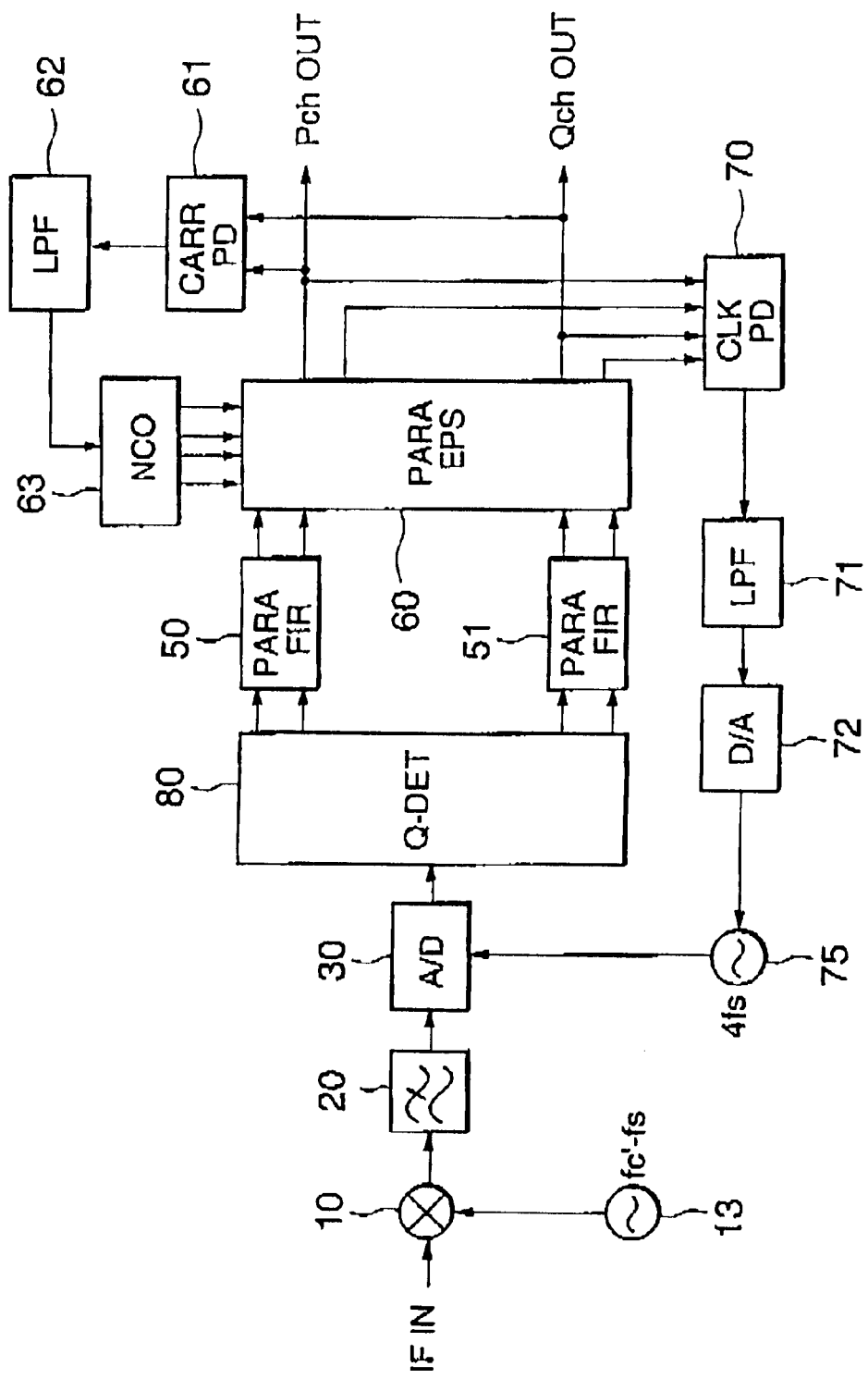
FIG. 18 is a block diagram showing a schematic structure of a demodulator according to a second embodiment of the invention.

Now, a demodulator as a second embodiment of the present invention will be described by referring to FIG. 18 and FIG. 19. In the demodulator shown in FIG. 18, the signal output from a local oscillator 13 has a frequency of fc'–fs. This signal is multiplied by the IF signal of carrier wave frequency fc in a mixer 10. The IF signal of the carrier wave frequency fc is subjected to frequency-conversion and is changed into an IF signal having the modulation speed fs as a pseudo carrier wave frequency. The signal output from the local oscillator 13 may have a frequency of fc'+fs. In this case, the direction of phase rotation needs to be corrected in the latter processing.

The IF signal with a pseudo carrier wave frequency fs passes through a low-pass filter 20 and sampled by an A/D converter 30. As shown in FIG. 18, the sampling rate of the A/D converter 30 is 4 fs. The data sequence sampled in this manner is delivered into a quadrature detector 80.

The quadrature detector 80 processes the data sequence to output four parallel base band signals $Pch_{Odd}$, $Pch_{Even}$, $Qch_{Odd}$, $Qch_{Even}$, each having the data rate of fs.

In detail, when the IF signal of a frequency fs is sampled according to a clock of 4 fs, P-channel and Q-channel BB signals of 2 fs can be obtained from the sine and cos relationships. That is, a quadrature detection can be carried out. In one cycle of the carrier wave, each of the sine component and cosine component of the carrier wave becomes "0" twice. At these points in time the other component indicates "1" or "−1". That is, if the sampling is carried out at a timing when either of the sine component or cosine component of the carrier wave becomes "0", their outputs become P, Q, P(BAR), Q(BAR), P, Q, . . . , where (BAR) indicates that the signal is an inverted signal.

Figure 19:
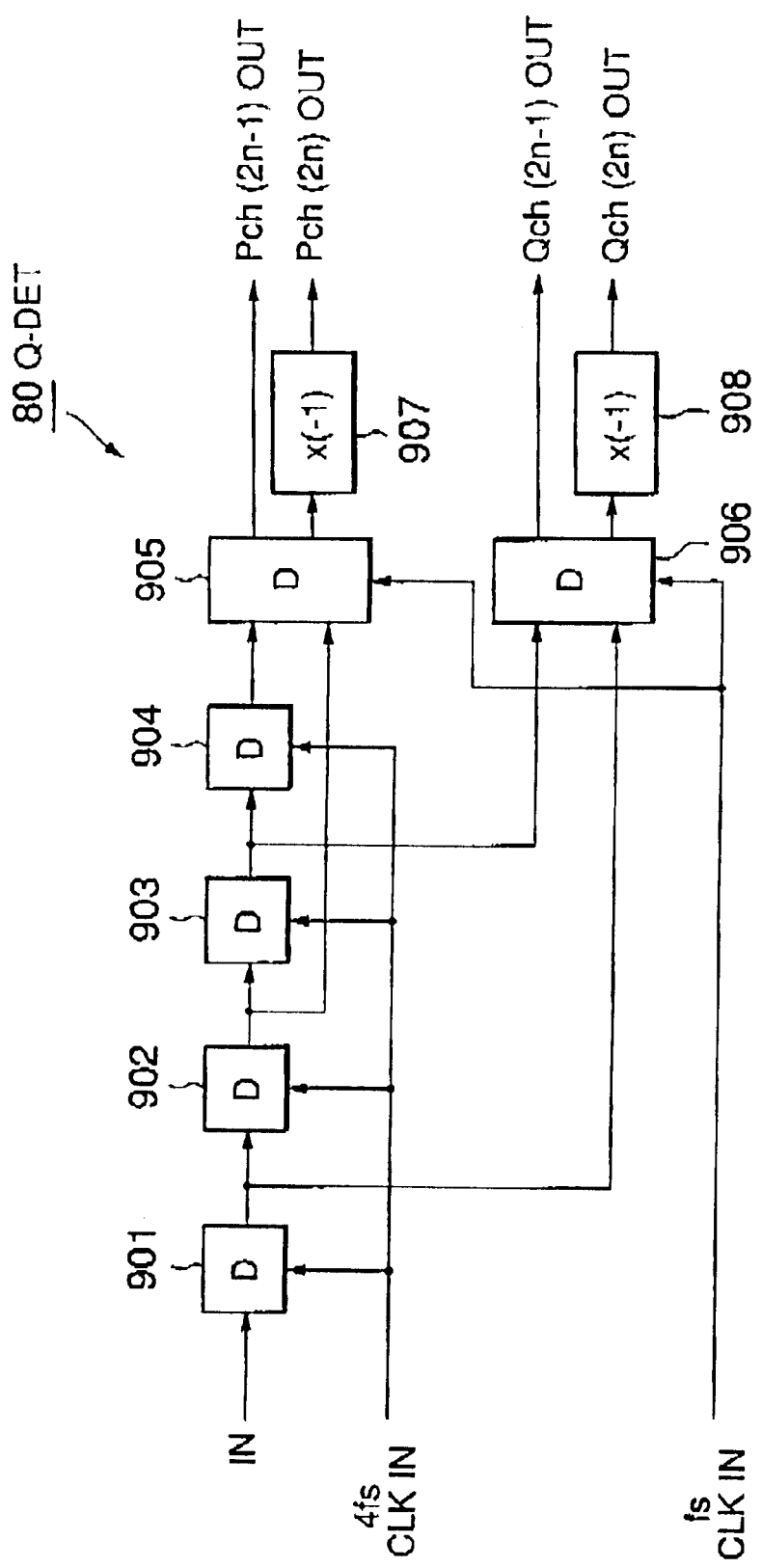
FIG. 19 is a diagram showing an example of a quadrature detector illustrated in FIG. 18.

Referring to FIG. 19, the quadrature detector 80 carries out digital signal processing based on the above principle. The illustrate quadrature detector 80 also has an S/P conversion function. The quadrature detector 80 converts, by the use of delay circuits 901–904, a serial data sequence, that has data rate of 4 fs and that is output from the A/D converter 30, into a set of four parallel data sequences. If we assume that the outputs of the delay circuits 904, 902 are P-channel signals, then the outputs of the delay circuits 903, 901 are Q-channel signals. The P-channel and Q-channel signals are delivered into delay circuits 905, 906 that operate at the speed fs, and are subjected to rate-conversion. In addition, one of the outputs of the delay circuit 905 Is inverted by an inverter 907. Similarly, one of the outputs of the delay circuit 906 is inverted by an inverter 908. In this way, the quadrature detector 80 outputs two parallel P-channel signals and two parallel Q-channel signals.

The signal processing at a stage following the quadrature detector 80 is carried out in the similar way as the signal processing of the above-mentioned first embodiment. Hence, the demodulator according to the second embodiment can adopt as a roll-off filter a parallel FIR filter shown in any one of FIGS. 2, 14, 15, 16 and 17.

As described above, unlike the demodulator according to the first embodiment, the demodulator according to the second embodiment carries out the quadrature detection by the digital signal processing. In addition, while the sampling frequency is four times the modulation speed in order to execute the quadrature detection in the digital signal processing, the processing at the later stage including the roll-off filter is carried out at the same speed as the modulation speed.

Next, a demodulator according to a third embodiment of this invention will be explained with reference to FIG. 20. While the demodulators according to the foregoing first and second embodiments are of a semi-synchronous detection type, the demodulator shown In FIG. 20 is not of the semi-synchronous detection type.

Figure 20:
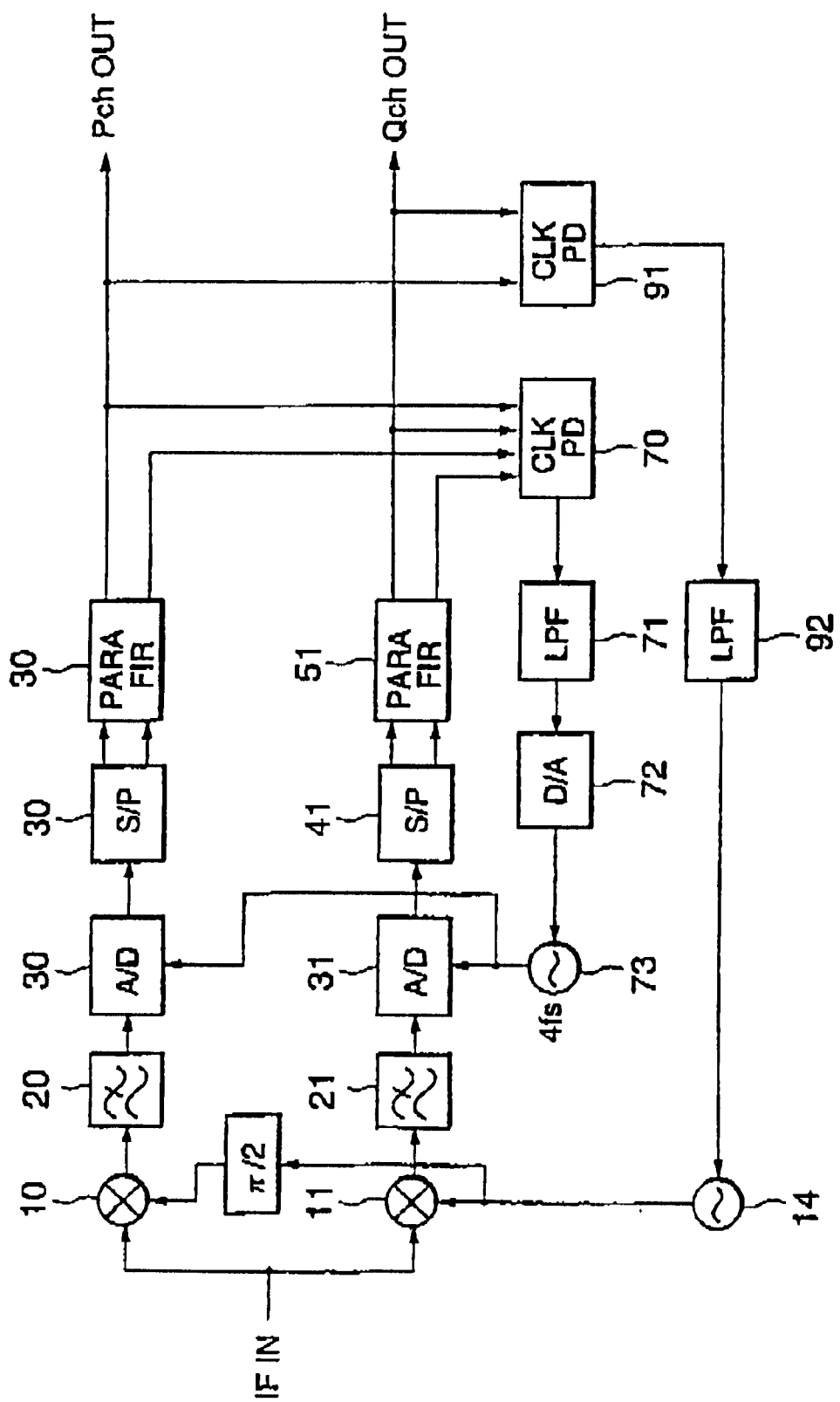
FIG. 20 is a block diagram showing a schematic structure of a demodulator according to a third embodiment of the invention.

The demodulator shown in FIG. 20 is of a synchronous detection type in which the eye pattern is open at the input of the A/D converters 30, 31. Hence, an EPS is not provided in the demodulator shown in FIG. 20. In this example, the roll-off filters 50, 51 and the clock phase detector 70 carry out the digital signal processing, too.

It should be noted that a loop filter 92 in the carrier wave regeneration loop shown in FIG. 20 is composed of an analog circuit. It Is however possible to digitize the carrier phase detector 91 and loop filter 92 and to provide a D/A converter following the loop filter 92. Other constitutional elements and their operations are similar to those of the first embodiment. For example, the demodulator according to the third embodiment may thus adopt a parallel FIR filter shown in any one of FIGS. 2, 14, 15, 16 and 17 as the roll-off filter.

While the invention has been particularly shown and described with respect to preferred embodiments thereof, it will be understood by those skilled in the art that changes in form and details may be made therein without departing from the scope and spirit of the invention. For example, although the output of the EPS is used for clock synchronization in the first and second embodiments, the clock synchronization may be carried out by the use of the output of the roll-off filter. In that case, there is no need to change the configuration of the loop filter 71, the D/A converter 72 and so forth, except that a total of four output MSBs of two roll-off filters are entered into the clock phase detector 70.

INDUSTRIAL APPLICABILITY

As described above, with this invention the digital processing speed in the demodulator is equal to the modulation speed fs. Hence, the demodulator according to the present invention can be applied to high-speed communication systems. In addition, the reduced digital processing speed in the demodulator can result in a reduction in the number of stages in the pipeline processing, which in turn reduces a circuit size and a control loop delay within the demodulator.

What is claimed is:

1. A demodulator comprising:
   an analog quadrature detector, responsive to a quadrature-modulated IF signal, to carry out an analog quadrature detection by the use of a predicted carrier frequency having a frequency substantially equal to an actual carrier frequency and to output first and second quadrature-detected signals that are orthogonal to each other;
   first and second A/D converters, responsive to the first and second quadrature-detected signals, to carry out A/D-conversion at a rate that is an even multiple of a modulation speed and to output first and second serial signals;
   first and second serial-parallel converters to convert the first and second serial signals into first and second sets of parallel signals, respectively, each of the first and second sets of parallel signals comprising a plurality of signals having the same data rate as the modulation speed;
   a first parallel FIR filter operating as a roll-off filter which parallelly filters the first set of parallel signals at the modulation speed to output a first pair of two filtered signals; and
   a second parallel FIR filter operating as a roll-off filter which parallelly filters the second set of parallel signals at the modulation speed to output a second pair of two filtered signals.

2. A demodulator as claimed in claim 1, wherein the first and second parallel FIR filters output, as first and second demodulated signals, a particular filtered signal selected from each of the first and second pairs of filtered signals.

3. A demodulator comprising:
   an analog quadrature detector, responsive to a quadrature-modulated IF signal, to carry out an analog quadrature detection by the use of a predicted carrier frequency having a frequency substantially equal to an actual carrier frequency and to output first and second quadrature-detected signals that are orthogonal to each other;
   first and second A/D converters, responsive to the first and second quadrature-detected signals, to carry out A/D-conversion at a rate two or more times a modulation speed and to output first and second serial signals;
   first and second serial-parallel converters to convert the first and second serial signals into first and second sets of parallel signals, respectively, each of the first and second sets of parallel signals comprising a plurality of signals having the same data rate as the modulation speed;
   a first parallel FIR filter operating as a roll-off filter which parallelly filters the first set of parallel signals at the modulation speed to output a first pair of two filtered signals; and
   a second parallel FIR filter operating as a roll-off filter which parallelly filters the second set of parallel signals at the modulation speed to output a second pair of two filtered signals;
   a parallel phase shifter, responsive to the first and second pairs of filtered signals, to carry out at the modulation speed an operation for removing a phase shift remaining in the processing of the analog quadrature detector by the use of an error signal representing a phase error for a carrier wave, the parallel phase shifter outputting first and second demodulated signals, and
   an error signal generator to monitor the first and second demodulated signals and to generate the error signal.

4. A demodulator claimed in claim 3, wherein the error signal generator comprises:
   a carrier phase detector, responsive to the first and second demodulated signals, to detect phase shifts that is from reference points to the first and second demodulated signals;
   a loop filter coupled to the carrier phase detector; and
   an NCO, coupled to the loop filter, to generate first and second error signals corresponding to the first and second pairs of filtered signals;
   wherein the parallel phase shifter outputs, by the use of the first and second error signals, the first and second demodulated signals synchronous with the carrier wave.

5. A demodulator as claimed in claim 3, wherein:
   the parallel phase shifter outputs a set of first to fourth phase-shifted signals;
   the first and second phase-shifted signals are generated in correspondence with the first pair of filtered signals,
   the third and fourth phase-shifted signals are generated in correspondence with the second pair of filtered signals, and
   the first and second demodulated signals are the first and third phase-shifted signals, respectively.

6. A demodulator as claimed in claim 5, further comprising:
   a clock phase detector to detect a clock phase by referencing an MSB of each of the first to fourth phase-shifted signals;
   a loop filter coupled to the clock phase detector;
   a D/A converter to carry out D/A-conversion on an output of the loop filter; and
   a VCO to supply the A/D converter with a sampling clock controlled according to an output of the D/A converter.

7. A demodulator as claimed in claim 5, further comprising:
   a clock phase detector to detect a clock phase by referencing an MSB of each of four signals which comprise the first and second pairs of filtered signals;
   a loop filter coupled to the clock phase detector;
   a D/A converter to carry out D/A-conversion on an output of the loop filter; and
   a VCO to supply the A/D converter with a sampling clock controlled according to an output of the D/A converter.

8. A demodulator comprising:
   an analog quadrature detector, responsive to a quadrature-modulated IF signal, to carry out an analog quadrature detection by the use of a predicted carrier frequency having a frequency substantially equal to an actual carrier frequency and to output first and second quadrature-detected signals that are orthogonal to each other;
   first and second A/D converters, responsive to the first and second quadrature-detected signals, to carry out A/D-conversion at a rate that is an even multiple of a modulation speed and to output first and second serial signals;

first and second serial-parallel converters to convert the first and second serial signals into first and second sets of parallel signals, respectively, each of the first and second sets of parallel signals comprising a plurality of signals having the same data rate as the modulation speed;

a first parallel FIR filter operating as a roll-off filter which parallelly filters the first set of parallel signals at the modulation speed to output a first pair of two filtered signals; and a second parallel FIR filter operating as a roll-off filter which parallelly filters the second set of parallel signals at the modulation speed to output a second pair of two filtered signals, wherein:

the A/D converter carries out the A/D conversion at two times the modulation speed;

each of the first and second sets of parallel signals comprises a pair of an odd-numbered data signal and an even-numbered data signal, in response to the pair of the odd-numbered data signal and the even-numbered data signal, the first parallel FIR filter outputs the first pair of filtered signals which comprises a pair of a filtered odd-numbered data signal and a filtered even-numbered data signal; and in response to the pair of the odd-numbered data signal and the even-numbered data signal, the second parallel FIR filter outputs the second pair of filtered signals which comprises a pair of a filtered odd-numbered data signal and a filtered even-numbered data signal.

9. A demodulator as claimed in claim 8, wherein:

each of the first and second parallel FIR filters comprises first to sixth delay circuits, first to tenth multipliers for which first to tenth multiplication coefficients are defined, respectively, and first to sixth adders;

the first to sixth delay circuits each have as a delay time a time represented by a reciprocal of the modulation speed;

the first, fifth, sixth and tenth multiplication coefficients are equal to each other;

the second, fourth, seventh and ninth multiplication coefficients are equal to each other;

the third and eighth multiplication coefficients are equal to each other;

the first and fourth delay circuits receive the odd-numbered data signal and the even-numbered data signal, respectively;

the second and fifth delay circuits receive outputs of the first and fourth delay circuits, respectively;

the third and sixth delay circuits receive outputs of the second and fifth delay circuits, respectively;

the first and second multipliers receive an output of the first delay circuit;

the third and fourth multipliers receive an output of the second delay circuit;

the fifth multiplier receives an output of the third delay circuit;

the sixth multiplier receives an output of the fourth delay circuit;

the seventh and eighth multipliers receive an output of the fifth delay circuit;

the ninth and tenth multipliers receive an output of the sixth delay circuit;

the first adder receives outputs of the first, third and fifth multipliers;

the second adder receives outputs of the second and fourth multipliers;

the third adder receives outputs of the sixth, eighth and tenth multipliers;

the fourth adder receives outputs of the seventh and ninth multipliers;

the fifth adder receives outputs of the first and fourth adders and produces, as an output of the fifth adder, the filtered odd-numbered data signal; and the sixth adder receives outputs of the second and third adders and produces as an output of the sixth adder, the filtered even-numbered data signal.

10. A demodulator as claimed in claim 8, wherein:

each of the first and second parallel FIR filters comprises first to sixth delay circuits, first to sixth multipliers for which first to sixth multiplication coefficients are defined, respectively, and first to eighth adders;

the first to sixth delay circuits each have as a delay time a time represented by a reciprocal of the modulation speed;

the first and fourth multiplication coefficients are equal to each other, the second and fifth multiplication coefficients are equal to each other;

the third and sixth multiplication coefficients are equal to each other;

the first and fourth delay circuits receive the odd-numbered data signal and the even-numbered data signal, respectively;

the second and fifth delay circuits receive outputs of the first and fourth delay circuits, respectively;

the third and sixth delay circuits receive outputs of the second and fifth delay circuits, respectively;

the first adder receives outputs of the first and third delay circuits;

the second adder receives outputs of the first and second delay circuits;

the third adder receives outputs of the fourth and sixth delay circuits;

the fourth adder receives outputs of the fifth and sixth delay circuits;

the first multiplier receives an output of the first adder;

the second multiplier receives an output of the second adder;

the third multiplier receives an output of the second delay circuit;

the fourth multiplier receives an output of the third adder;

the fifth multiplier receives an output of the fourth adder;

the sixth multiplier receives an output of the fifth delay circuit;

the fifth adder receives outputs of the first and third multipliers;

the sixth adder receives outputs of the fourth and sixth multipliers;

the seventh adder receives outputs of the fifth adder and the fifth multiplier and produces as an output of the seventh adder the filtered odd-numbered data signal; and the eighth adder receives outputs of the sixth adder and the second multiplier and produces as an output of the eighth adder the filtered even-numbered data signal.

11. A demodulator as claimed in claim 8, wherein:

each of the first and second parallel FIR filters comprises first to sixth delay circuits, first to eighth multipliers for which first to eighth multiplication coefficients are defined, respectively, and first to sixth adders;

the first to sixth delay circuits each have as a delay time a time represented by a reciprocal of the modulation speed;

the first, fourth, fifth and eighth multiplication coefficients are equal to each other;

the second, third, sixth and seventh multiplication coefficient are equal;

the first and fourth delay circuits receive the odd-numbered data signal and the even-numbered data signal, respectively;

the second and fifth delay circuit receive outputs of the first and fourth delay circuits, respectively;

the third and sixth delay circuits receive outputs of the second and fifth delay circuits, respectively;

the first multiplier receives an output of the first delay circuit;

the second and third multipliers receive an output of the second delay circuit;

the fourth multiplier receives an output of the third delay circuit;

the fifth and sixth multipliers receive an output of the fifth delay circuit;

the seventh and eighth multipliers receive an output of the sixth delay circuit;

the first adder receives outputs of the first and third multipliers;

the second adder receives outputs of the second and fourth multipliers;

the third adder receives outputs of the fifth and seventh multipliers;

the fourth adder receives outputs of the sixth and eighth multipliers;

the fifth adder receives outputs of the second and third adders and produces as an output of the fifth adder the filtered odd-numbered data signal; and the sixth adder receives outputs of the first and fourth adders and produces as an output of the sixth adder the filtered even-numbered data signal.

12. A demodulator comprising:

an analog detector, responsive to a quadrature-modulated first IF signal, to carry out a wave detection by the use of a predetermined frequency whose difference from a predicted carrier frequency is a modulation speed, the predicted carrier frequency having a frequency substantially equal to an actual carrier frequency, the analog detector outputting a second IF signal having the modulation speed as a pseudo-carrier frequency;

an A/D converter, responsive to the second IF signal, to carry out A/D-conversion at four times the modulation speed and to output a serial signal;

a quadrature detector, responsive to the serial signal, to carry out quadrature-detection and to output first and second sets of parallel signals, each of the first and second sets of parallel signals comprising a plurality of signals having the same data rates as the modulation speed;

a first parallel FIR filter to operate as a roll-off filter which parallelly filters the first set of parallel signals at the modulation speed to output a first pair of two filtered signals; and a second parallel FIR filter to operate as a roll-off filter which parallelly filters the second set of parallel signals at the modulation speed to output a second pair of two filtered signals.

13. A demodulator as claimed in claim 12, wherein the first and second parallel FIR filters output, as first and second demodulated signals, a particular filtered signal selected from each of the first and second pairs of filtered signals.

14. A demodulator comprising:

an analog detector, responsive to a quadrature-modulated first IF signal, to carry out a wave detection by the use of a predetermined frequency whose difference from a predicted carrier frequency is a modulation speed, the predicted carrier frequency having, a frequency substantially equal to an actual carrier frequency, the analog detector outputting a second IF signal having the modulation speed as a pseudo-carrier frequency;

an A/D converter, responsive to the second IF signal, to carry out A/D-conversion at four times the modulation speed and to output a serial signal;

a quadrature detector, responsive to the serial signal, to carry out quadrature-detection and to output first and second sets of parallel signals, each of the first and second sets of parallel signals comprising a plurality of signals having the same data rates as the modulation speed;

a first parallel FIR filter to operate as a roll-off filter which parallelly filters the first set of parallel signals at the modulation speed to output a first pair of two filtered signals; and a second parallel FIR filter to operate as a roll-off filter which parallelly filters the second set of parallel signals at the modulation speed to output a second pair of two filtered signals;

a parallel phase shifter, responsive to the first and second pairs of filtered signals, to carry out at the modulation speed an operation for removing a phase shift remaining in the processing of the analog detector by the use of an error signal representing a phase error for a carrier wave, the parallel shifter outputting first and second demodulated signals; and an error signal generator to monitor the first and second demodulated signals and to generate the error signal.

15. A demodulator as claimed in claim 14, wherein the error signal generator comprises:

a carrier phase detector, responsive to the first and second demodulated signals, to detect phase shifts that is from reference points to the first and second demodulated signals;

a loop filter coupled to the carrier phase detector; and an NCO, coupled to the loop filter, to generate first and second error signals corresponding to the first and second pairs of filtered signals;

wherein the parallel phase shifter outputs, by the use of the first and second error signals, the first and second demodulated signals synchronous with the carrier wave.

16. A demodulator as claimed in claim 14, wherein:

the parallel phase shifter outputs a set of first to fourth phase-shifted signals;

the first and second phase-shifted signals are generated in correspondence with the first pair of filtered signals;

the third and fourth phase-shifted signals are generated in correspondence with the second pair of filtered signals; and the first and second demodulated signals are the first and third phase-shifted signals, respectively.

17. A demodulator as claimed in claim 16, further comprising:
    a clock phase detector to detect a clock phase by referencing an MSB of each of the first to fourth phase-shifted signals;
    a loop filter coupled to the clock phase detector;
    a D/A converter to carry out D/A-conversion on an output of the loop filter; and
    a VCO to supply the A/D converter with a sampling clock controlled according to an output of the D/A converter.

18. A demodulator as claimed in claim 16, further comprising:
    a clock phase detector to detect a clock phase by referencing an MSB of each of four signals which comprise the first and second pairs of filtered signals;
    a loop filter coupled to the clock phase detector;
    a D/A converter to carry out D/A-conversion on an output of the loop filter; and
    a VCO to supply the A/D converter with a sampling clock controlled according to an output of the D/A converter.

19. A demodulator comprising:
    an analog detector, responsive to a quadrature-modulated first IF signal, to carry out a wave detection by the use of a predetermined frequency whose difference from a predicted carrier frequency is a modulation speed, the predicted carrier frequency having a frequency substantially equal to an actual carrier frequency, the analog detector outputting a second IF signal having the modulation speed as a pseudo-carrier frequency;
    an A/D converter, responsive to the second IF signal, to carry out A/D-conversion at four times the modulation speed and to output a serial signal;
    a quadrature detector, responsive to the serial signal, to carry out quadrature-detection and to output first and second sets of parallel signals, each of the first and second sets of parallel signals comprising a plurality of signals having the same data rates as the modulation speed;
    a first parallel FIR filter to operate as a roll-off filter which parallelly filters the first set of parallel signals at the modulation speed to output a first pair of two filtered signals; and
    a second parallel FIR filter to operate as a roll-off filter which parallelly filters the second set of parallel signals at the modulation speed to output a second pair of two filtered signals, wherein:
        the A/D converter carries out the A/D conversion at two times the modulation speed;
        each of the first and second sets of parallel signals comprises a pair of an odd-numbered data signal and an even-numbered data signal;
        in response to the pair of the odd-numbered data signal and the even-numbered data signal, the first parallel FIR filter outputs the first pair of filtered signals which comprises a pair of a filtered odd-numbered data signal and a filtered even-numbered data signal, and
        in response to the pair of the odd-numbered data signal and the even-numbered data signal, the second parallel FIR filter outputs the second pair of filtered signals which comprises a pair of a filtered odd-numbered data signal and a filtered even-numbered data signal.

20. A demodulator as claimed in claim 19, wherein:
    each of the first and second parallel FIR filters comprises first to sixth delay circuits, first to tenth multipliers for which first to tenth multiplication coefficients are defined, respectively, and first to sixth adders;
    the first to sixth delay circuits each have as a delay time a time represented by a reciprocal of the modulation speed;
    the first, fifth, sixth and tenth multiplication coefficients are equal to each other;
    the second, fourth, seventh and ninth multiplication coefficients are equal to each other;
    the third and eighth multiplication coefficients are equal to each other;
    the first and fourth delay circuits receive the odd-numbered data signal and the even-numbered data signal, respectively;
    the second and fifth delay circuits receive outputs of the first and fourth delay circuits, respectively;
    the third and sixth delay circuits receive outputs of the second and fifth delay circuits, respectively;
    the first and second multipliers receive an output of the first delay circuit;
    the third and fourth multipliers receive an output of the second delay circuit;
    the fifth multiplier receives an output of the third delay circuit;
    the sixth multiplier receives an output of the fourth delay circuit;
    the seventh and eighth multipliers receive an output of the fifth delay circuit;
    the ninth and tenth multipliers receive an output of the sixth delay circuit;
    the first adder receives outputs of the first, third and fifth multipliers;
    the second adder receives outputs of the second and fourth multipliers;
    the third adder receives outputs of the sixth, eighth and tenth multipliers;
    the fourth adder receives outputs of the seventh and ninth multipliers;
    the fifth adder receives outputs of the first and fourth adders and produces as an output of the fifth adder the filtered odd-numbered data signal; and
    the sixth adder receives outputs of the second and third adders and produces as an output of the sixth adder the filtered even-numbered data signal.

21. A demodulator as claimed in claim 19, wherein:
    each of the first and second parallel FIR filters comprises first to sixth delay circuits, first to sixth multipliers for which first to sixth multiplication coefficients are defined, respectively, and first to eighth adders;
    the first to sixth delay circuits each have as a delay time a time represented by a reciprocal of the modulation speed;
    the first and fourth multiplication coefficients are equal to each other;
    the second and fifth multiplication coefficients are equal to each other;
    the third and sixth multiplication coefficients are equal to each other;
    the first and fourth delay circuits receive the odd-numbered data signal and the even-numbered data signal, respectively;

the second and fifth delay circuits receive outputs of the first and fourth delay circuits, respectively;

the third and sixth delay circuits receive outputs of the second and fifth delay circuits, respectively;

the first adder receives outputs of the first and third delay circuits;

the second adder receives outputs of the first and second delay circuits;

the third adder receives outputs of the fourth and sixth delay circuits;

the fourth adder receives outputs of the fifth and sixth delay circuits;

the first multiplier receives an output of the first adder;

the second multiplier receives an output of the second adder;

the third multiplier receives an output of the second delay circuit;

the fourth multiplier receives an output of the third adder;

the fifth multiplier receives an output of the fourth adder;

the sixth multiplier receives an output of the fifth delay circuit;

the fifth adder receives outputs of the first and third multipliers;

the sixth adder receives outputs of the fourth and sixth multipliers;

the seventh adder receives outputs of the fifth adder and the fifth multiplier and produces as an output of the seventh adder the filtered odd-numbered data signal; and the eighth adder receives outputs of the sixth adder and the second multiplier and produces as an output of the eighth adder the filtered even-numbered data signal.

22. A demodulator as claimed in claim 19, wherein:

each of the first and second parallel FIR filters comprises first to sixth delay circuits, first to eighth multipliers for which first to eighth multiplication coefficients are defined, respectively, and first to sixth adders;

the first to sixth delay circuits each have as a delay time a time represented by a reciprocal of the modulation speed;

the first, fourth, fifth and eighth multiplication coefficients are equal to each other;

the second, third, sixth and seventh multiplication coefficient are equal to each other;

the first and fourth delay circuits receive the odd-numbered data signal and the even-numbered data signal, respectively;

the second and fifth delay circuit receive outputs of the first and fourth delay circuits, respectively;

the third and sixth delay circuits receive outputs of the second and fifth delay circuits, respectively;

the first multiplier receives an output of the first delay circuit;

the second and third multipliers receive an output of the second delay circuit;

the fourth multiplier receives an output of the third delay circuit;

the fifth and sixth multipliers receive an output of the fifth delay circuit;

the seventh and eighth multipliers receive an output of the sixth delay circuit;

the first adder receives outputs of the first and third multipliers;

the second adder receives outputs of the second and fourth multipliers;

the third adder receives outputs of the fifth and seventh multipliers;

the fourth adder receives outputs of the sixth and eighth multipliers;

the fifth adder receives outputs of the second and third adders and produces as an output of the fifth adder the filtered odd-numbered data signal; and the sixth adder receives outputs of the first and fourth adders and produces as an output of the sixth adder the filtered even-numbered data signal.

23. A parallel FIR filter adapted to operate as a parallel roll-off filter which, in response to a pair of an odd-numbered data signal and an even-numbered data signal obtained by serial-parallel-converting a serial data signal, outputs a pair of a filtered odd-numbered data signal and a filtered even-numbered data signal, the parallel FIR filter comprising: first to sixth delay circuits; first to tenth multipliers for which first to tenth multiplication coefficients are defined, respectively; and first to sixth adders; wherein:

the first to sixth delay circuits having predetermined times as their delay times, respectively;

the first, fifth, sixth and tenth multiplication coefficients are equal to each other;

the second, fourth, seventh and ninth multiplication coefficients are equal to each other;

the third and eighth multiplication coefficients are equal to each other;

the first and fourth delay circuits receive the odd-numbered data signal and the even-numbered data signal, respectively;

the second and fifth delay circuits receive outputs of the first and fourth delay circuits, respectively;

the third and sixth delay circuits receive outputs of the second and fifth delay circuits, respectively;

the first and second multipliers receive an output of the first delay circuit;

the third and fourth multipliers receive an output of the second delay circuit;

the fifth multiplier receives an output of the third delay circuit;

the sixth multiplier receives an output of the fourth delay circuit;

the seventh and eighth multipliers receive an output of the fifth delay circuit;

the ninth and tenth multipliers receive an output of the sixth delay circuit;

the first adder receives outputs of the first, third and fifth multipliers;

the second adder receives outputs of the second and fourth multipliers; the third adder receives outputs of the sixth, eighth and tenth multipliers;

the fourth adder receives outputs of the seventh and ninth multipliers;

the fifth adder receives outputs of the first and fourth adders and produces as an output of the fifth adder the filtered odd-numbered data signal; and the sixth adder receives outputs of the second and third adders and produces as an output of the sixth adder the filtered even-numbered data signal.

24. A parallel FIR filter adapted to operate as a parallel roll-off filter which, in response to a pair of an odd-numbered data signal and an even-numbered data signal obtained by serial-parallel-converting a serial data signal, outputs a pair of a filtered odd-numbered data signal and a filtered even-numbered data signal, the parallel FIR filter comprising: first to sixth delay circuits; first to sixth multipliers for which first to sixth multiplication coefficients are defined, respectively; and first to eighth adders; wherein:

the first to sixth delay circuits having predetermined times as their delay times, respectively;

the first and fourth multiplication coefficients are equal to each other;

the second and fifth multiplication coefficients are equal to each other;

the third and sixth multiplication coefficients are equal to each other;

the first and fourth delay circuits receive the odd-numbered data signal and the even-numbered data signal, respectively;

the second and fifth delay circuits receive outputs of the first and fourth delay circuits, respectively;

the third and sixth delay circuits receive outputs of the second and fifth delay circuits, respectively;

the first adder receives outputs of the first and third delay circuits;

the second adder receives outputs of the first and second delay circuits;

the third adder receives outputs of the fourth and sixth delay circuits;

the fourth adder receives outputs of the fifth and sixth delay circuits;

the first multiplier receives an output of the first adder;

the second multiplier receives an output of the second adder;

the third multiplier receives an output of the second delay circuit;

the fourth multiplier receives an output of the third adder;

the fifth multiplier receives an output of the fourth adder;

the sixth multiplier receives an output of the fifth delay circuit;

the fifth adder receives outputs of the first and third multipliers;

the sixth adder receives outputs of the fourth and sixth multipliers;

the seventh adder receives outputs of the fifth adder and the fifth multiplier and produces as an output of the seventh adder the filtered odd-numbered data signal; and the eighth adder receives outputs of the sixth adder and the second multiplier and produces as an output of the eighth adder the filtered even-numbered data signal.

25. A parallel FIR filter adapted to operate as a parallel roll-off filter which, in response to a pair of an odd-numbered data signal and an even-numbered data signal obtained by serial-parallel-converting a serial data signal, outputs a pair of a filtered odd-numbered data signal and a filtered even-numbered data signal, the parallel FIR filter comprising: first to sixth delay circuits; first to eighth multipliers for which first to eighth multiplication coefficients are defined, respectively; and first to sixth adders; wherein:

the first to sixth delay circuits having predetermined times as their delay times, respectively;

the first, fourth, fifth and eighth multiplication coefficients are equal to each other;

the second, third, sixth and seventh multiplication coefficient are equal to each other;

the first and fourth delay circuits receive the odd-numbered data signal and the even-numbered data signal, respectively;

the second and fifth delay circuit receive outputs of the first and fourth delay circuits, respectively;

the third and sixth delay circuits receive outputs of the second and fifth delay circuits, respectively;

the first multiplier receives an output of the first delay circuit;

the second and third multipliers receive an output of the second delay circuit;

the fourth multiplier receives an output of the third delay circuit;

the fifth and sixth multipliers receive an output of the fifth delay circuit;

the seventh and eighth multipliers receive an output of the sixth, delay circuit;

the first adder receives outputs of the first and third multipliers;

the second adder receives outputs of the second and fourth multipliers; the third adder receives outputs of the fifth and seventh multipliers;

the fourth adder receives outputs of the sixth and eighth multipliers;

the fifth adder receives outputs of the second and third adders and produces as an output of the fifth adder the filtered odd-numbered data signal; and the sixth adder receives outputs of the first and fourth adders and produces as an output of the sixth adder the filtered even-numbered data signal.

26. A demodulator comprising:

an analog quadrature detector, responsive to a quadrature-modulated IF signal, to carry out an analog quadrature detection by the use of a predicted carrier frequency having a frequency substantially equal to an actual carrier frequency and to output first and second quadrature-detected signals that are orthogonal to each other;

first and second A/D converters, responsive to the first and second quadrature-detected signals, to carry out A/D-conversion at a rate that is an even multiple of a modulation speed and to output first and second serial signals;

first and second serial-parallel converters to convert the first and second serial signals into first and second sets of parallel signals, respectively, each of the first and second sets of parallel signals comprising a plurality of signals having the same data rate as the modulation speed;

a first parallel FIR filter operating as a roll-off filter which parallelly filters the first set of parallel signals at the modulation speed to output a first pair of two filtered signals;

a second parallel FIR filter operating as a roll-off filter which parallelly filters the second set of parallel signals at the modulation speed to output a second pair of two filtered signals; and a parallel phase shifter, responsive to the first and second pairs of filtered signals, to carry out at the modulation speed an operation for removing a phase shift remaining in the processing of the analog quadrature detector by the use of an error signal representing a phase error for a carrier wave, the parallel phase shifter outputting first and second demodulated signals.

27. A demodulator claimed in claim 26, further comprising:
an error signal generator to monitor the first and second demodulated signals and to generate an error signal representing a phase error for a carrier wave.

28. A demodulator comprising:
an analog detector, responsive to a quadrature-modulated first IF signal, to carry out a wave detection by the use of a predetermined frequency whose difference from a predicted carrier frequency is a modulation speed, the predicted carrier frequency having a frequency substantially equal to an actual carrier frequency, the analog detector outputting a second IF signal having the modulation speed as a pseudo-carrier frequency;

an A/D converter, responsive to the second IF signal, to carry out A/D-conversion at four times the modulation speed and to output a serial signal;

a quadrature detector, responsive to the serial signal, to carry out quadrature-detection and to output first and second sets of parallel signals, each of the first and second sets of parallel signals comprising a plurality of signals having the same data rates as the modulation speed;

a first parallel FIR filter to operate as a roll-off filter which parallelly filters the first set of parallel signals at the modulation speed to output a first pair of two filtered signals;

a second parallel FIR filter to operate as a roll-off filter which parallelly filters the second set of parallel signals at the modulation speed to output a second pair of two filtered signals; and a parallel phase shifter, responsive to the first and second pairs of filtered signals, to carry out at the modulation speed an operation for removing a phase shift remaining in the processing of the analog quadrature detector by the use of an error signal representing a phase error for a carrier wave, the parallel phase shifter outputting first and second demodulated signals.

29. A demodulator claimed in claim 28, further comprising:
an error signal generator to monitor the first and second demodulated signals and to generate an error signal representing a phase error for a carrier wave.

* * * * *